United States Patent
Wu et al.

(10) Patent No.: US 10,771,208 B2
(45) Date of Patent: Sep. 8, 2020

(54) IN-BAND BACKHAUL WITH LAYERED DIVISION MULTIPLEXING

(71) Applicant: Her Majesty the Queen in Right of Canada, as represented by the Minister of Industry, through the Communications Research Centre Canada, Ottawa, Ontario (CA)

(72) Inventors: Yiyan Wu, Kanata (CA); Liang Zhang, Ottawa (CA); Wei Li, Kanata (CA); Khalil Salehian, Ottawa (CA); Sébastien Laflèche, Gatineau (CA)

(73) Assignee: Her Majesty the Queen in the Right of Canada, as represented by the Minister of Industry, through the Communications Research Centre Canada, Ottawa, Ontario (CA)

( * ) Notice: Subject to any disclaimer, the term of this patent is extended or adjusted under 35 U.S.C. 154(b) by 0 days.

(21) Appl. No.: 16/245,302

(22) Filed: Jan. 11, 2019

(65) Prior Publication Data

US 2019/0222375 A1    Jul. 18, 2019

Related U.S. Application Data

(60) Provisional application No. 62/616,663, filed on Jan. 12, 2018, provisional application No. 62/636,558, filed on Feb. 28, 2018.

(51) Int. Cl.
*H04L 12/801* (2013.01)
*H04L 12/24* (2006.01)
(Continued)

(52) U.S. Cl.
CPC ......... *H04L 5/0035* (2013.01); *H04B 7/0413* (2013.01); *H04L 1/0071* (2013.01);
(Continued)

(58) Field of Classification Search
CPC . H04L 5/0035; H04L 25/022; H04L 25/0224; H04L 1/0071; H04L 2025/03851
See application file for complete search history.

(56) References Cited

U.S. PATENT DOCUMENTS 8,761,074 B2    6/2014  Blankenship et al. ........ 370/315
9,479,826 B2   10/2016  Wu et al.
(Continued)

OTHER PUBLICATIONS

"Using Non-Orthogonal Multiplexing for In-Band Full-Duplex Backhaul for 5G Broadcasting" by Zhang et al. 2018 IEEE 5G World Forum (5GWF) Conference Jul. 9-11, 2018.
(Continued)

*Primary Examiner* — Brian S Roberts
*Assistant Examiner* — Abusayeed M Haque
(74) *Attorney, Agent, or Firm* — Teitelbaum & Bouevitch; Neil Teitelbaum

(57) ABSTRACT

A primary transmitter of a multicast communication system transmits in-band backhaul to a relay transmitter using an LDM signal that also carries services to end-users. The relay transmitter processes received wireless signal to extract the in-band backhaul and re-transmits services obtained from the in-band backhaul in same or different frequency channel. The in-band backhaul may be transmitted in a high-capacity layer of the LDM signal carrying or in a separate timeslot. Transmitter-specific signature signals may be used for loopback and forward channel estimation at the relay transmitter. The in-band backhaul may also carry service data for devices in a different network.

20 Claims, 27 Drawing Sheets

(51) Int. Cl.
*H04L 5/14* (2006.01)
*H04L 12/28* (2006.01)
*H04L 5/00* (2006.01)
*H04L 25/02* (2006.01)
*H04B 7/0413* (2017.01)
*H04L 1/00* (2006.01)
*H04L 25/03* (2006.01)

(52) U.S. Cl.
CPC ........ *H04L 25/022* (2013.01); *H04L 25/0224* (2013.01); *H04L 25/03006* (2013.01); *H04L 2025/0377* (2013.01); *H04L 2025/03815* (2013.01)

(56) References Cited

U.S. PATENT DOCUMENTS

| | | | | |
|---|---|---|---|---|
| 2013/0176987 | A1* | 7/2013 | Kawamura | H04L 5/005 |
| | | | | 370/330 |
| 2013/0336195 | A1* | 12/2013 | Seo | H04L 5/0016 |
| | | | | 370/315 |
| 2015/0278040 | A1* | 10/2015 | Sikkink | G06F 13/4022 |
| | | | | 714/5.1 |
| 2016/0005268 | A1* | 1/2016 | Bronston | G07F 17/3244 |
| | | | | 463/25 |
| 2016/0065268 | A1* | 3/2016 | Dobyns | H04L 63/0428 |
| | | | | 455/41.1 |
| 2016/0205631 | A1* | 7/2016 | Chen | H04W 52/04 |
| | | | | 455/522 |
| 2016/0277038 | A1 | 9/2016 | Baek et al. | |
| 2016/0294460 | A1* | 10/2016 | Karsi | H04B 7/061 |
| 2017/0048775 | A1 | 2/2017 | Kim | |

OTHER PUBLICATIONS

"Using Layered-Division-Multiplexing for in-band backhaul for ATSC 3.0 SFN and Gapfillers" Shang et al. IEEE 2018—2018 IEEE International Symposium on Broadband Multimedia Systems and Broadcasting Conference Jun. 6-8, 2018.

"Relaying Operation in 3GPP LTE: Challenger and Solutions" Hoymann et al. IEEE Communication Magazine Feb. 2012 pp. 156-162.

"Point-to-Multipoint In-Band mmWave Backhaul for 5G Networks" Taori et al. IEEE Communication Magazine Jan. 2015 pp. 195-201.

"Backhauling 5G Small Cells: A radio Resource Management Perspective" Wang et al. IEEE Wireless Communications Oct. 2015 pp. 41 to 49.

* cited by examiner

FIG. 28A

| L1 | L1 Broadcast Services | |
|---|---|---|
| L2 | L2 Local Broadcast Services | L1 Broadcast Backhaul |

FIG. 28B

| L1 | L1 Broadcast Services | | | |
|---|---|---|---|---|
| L2 | UE-3 | UE-2 | UE-1 | Broadcast Backhaul |

FIG. 28C

| L1 | Mobile Broadcast Services | |
|---|---|---|
| L2 | Mobile Backhaul | Broadcast Backhaul |

FIG. 28D

| L1 | Other Services (IoT, etc.) | | | L1 Broadcast Services | |
|---|---|---|---|---|---|
| L2 | UE-3 | UE-2 | UE-1 | | Broadcast Backhaul |

IN-BAND BACKHAUL WITH LAYERED DIVISION MULTIPLEXING

CROSS REFERENCE TO RELATED APPLICATIONS

This application claims the benefit of U.S. Provisional Application No. 62/616,663 filed Jan. 12, 2018, and U.S. Provisional Application No. 62/636,558 filed Feb. 28, 2018 which are incorporated herein by reference,

TECHNICAL FIELD

The present disclosure generally relates to wireless communication systems, and more particularly to wireless multicast communication systems using Layered Division Multiplexing (LDM).

BACKGROUND

With the rapidly increasing number of mobile and handheld devices, delivering robust mobile service becomes a necessary capability for TV broadcasting systems, including those complying with the ATSC 3.0 standards for television broadcasting. However providing good mobile service coverage using the existing high-power high-tower (HPHT) single transmitter approach may be challenging. Single frequency networks (SFN) with multiple transmitters can significantly improve the quality of experience (QoE) for mobile users and for users of small-size handheld and portable receivers in challenging environments such as indoor locations. Therefore, deploying lower-power SFN transmitters, possibly in addition to the existing high-power tower, becomes a major trend.

One SFN deployment scenario is to add low-power SFN transmitters (SFN-Tx), also called SFN gapfillers (SFN-GF), to cover holes in a general service area of an existing HPHT transmitter. Another example SFN deployment scenario includes deploying regular SFN transmitters, with the existing HPHT transmitter becoming part of a more uniformly distributed SFN network to cover a larger geographic area.

To implement an SFN, providing backhaul links to each SFN transmitter is needed. Backhaul links are used in wireless communications systems to deliver service data from traffic gateways to radio transmitters. Backhaul links are usually implemented using dedicated wired connections, or wirelessly using dedicated microwave links. However, these solutions can be either unavailable or expensive to install and operate. Lower-cost approaches to providing backhaul to SFN transmitters deployed to broadcast TV and other services in a large area are desirable.

SUMMARY

One or more aspects of the present disclosure relate to a multicast communication system (MCS) comprising a primary transmitter station (PTS) and a first relay transmitter station (RTS). The PTS may be configured to wirelessly transmit a first transmission (Tx) signal that comprises a first (L1) signal layer and a second (L2) signal layer, wherein the L2 signal layer is superimposed over the L1 signal layer using layered division multiplexing (LDM). The L1 signal layer of the first Tx signal may comprise L1 service signals carrying first service data to end-users. The PTS may be further configured to include in-band backhaul (IBBH) signals in the first Tx signal. The RTS may be configured to receive a relay signal comprising the first Tx signal, extract the IBBH signals contained in the first Tx signal, and transmit a second Tx signal comprising backhaul service data obtained from the IBBH signals.

One or more aspects of the present disclosure relate to a relay transmitter station (RTS) for a wireless multicast communication system (MCS), the MCS comprising a plurality of transmitter stations configured to transmit service data to users over a same carrier frequency, the RTS comprising a receive (Rx) antenna, a relay signal processor, and a Tx antenna. The Rx antenna may be configured to receive a relay signal comprising a first transmission (Tx) signal, the first Tx signal comprising a first (L1) signal layer and a second (L2) signal layer, wherein the L2 signal layer is superimposed over the L1 signal layer using layered division multiplexing (LDM), wherein the L1 signal layer comprises L1 service signals carrying first service data, wherein the first Tx signal further includes in-band backhaul (IBBH) signals data comprising backhaul service data. The relay signal processor may be configured to extract the backhaul data from the received relay signal. The Tx antenna may be configured to transmit a second Tx signal comprising the backhaul service data.

One or more aspects of the present disclosure relate to a method for operating a wireless multicast communication system (MCS) comprising a plurality of transmitter stations (TSs) configured to transmit services to end-users over a same carrier frequency. The method may comprise: a) generating, at a first TS from the plurality of TSs, a first transmission (Tx) signal carrying service signals to end users using layered division multiplexing (LDM), and including in the first Tx signal in-band backhaul (IBBH) signals carrying backhaul service data, and b) wirelessly transmitting the first Tx signal. The method may further comprise, at a second TS from the plurality of TSs, c) wirelessly receiving a relay signal comprising the first Tx signal, d) performing channel estimation to extract a portion of the first Tx signal comprising the IBBH signals, e) retrieving the backhaul service data contained in the IBBH signals, and, f) wirelessly transmitting a second Tx signal comprising the backhaul service data.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

Embodiments disclosed herein will be described in greater detail with reference to the accompanying drawings, which are not to scale, in which like elements are indicated with like reference numerals, and wherein:

FIG. 28A is a schematic diagram of an LDM signal block with the L2 layer carrying local broadcast services and the backhaul for L1 layer broadcast services;

FIG. 28B is a schematic diagram of an LDM signal block with the L2 layer carrying unicast service signals and the backhaul for L1 layer broadcast services;

FIG. 28C is a schematic diagram of an LDM signal block with the L1 layer carrying mobile broadcast services, and the L2 layer carrying mobile broadband backhaul and broadcast backhaul for a different frequency channel;

FIG. 28D is a schematic diagram of an LDM signal block with the L1 layer carrying broadcast services and other services (IoT, etc), and the L2 layer carrying unicast service signals and the backhaul for L1 layer broadcast services;

DETAILED DESCRIPTION

Figure 1:
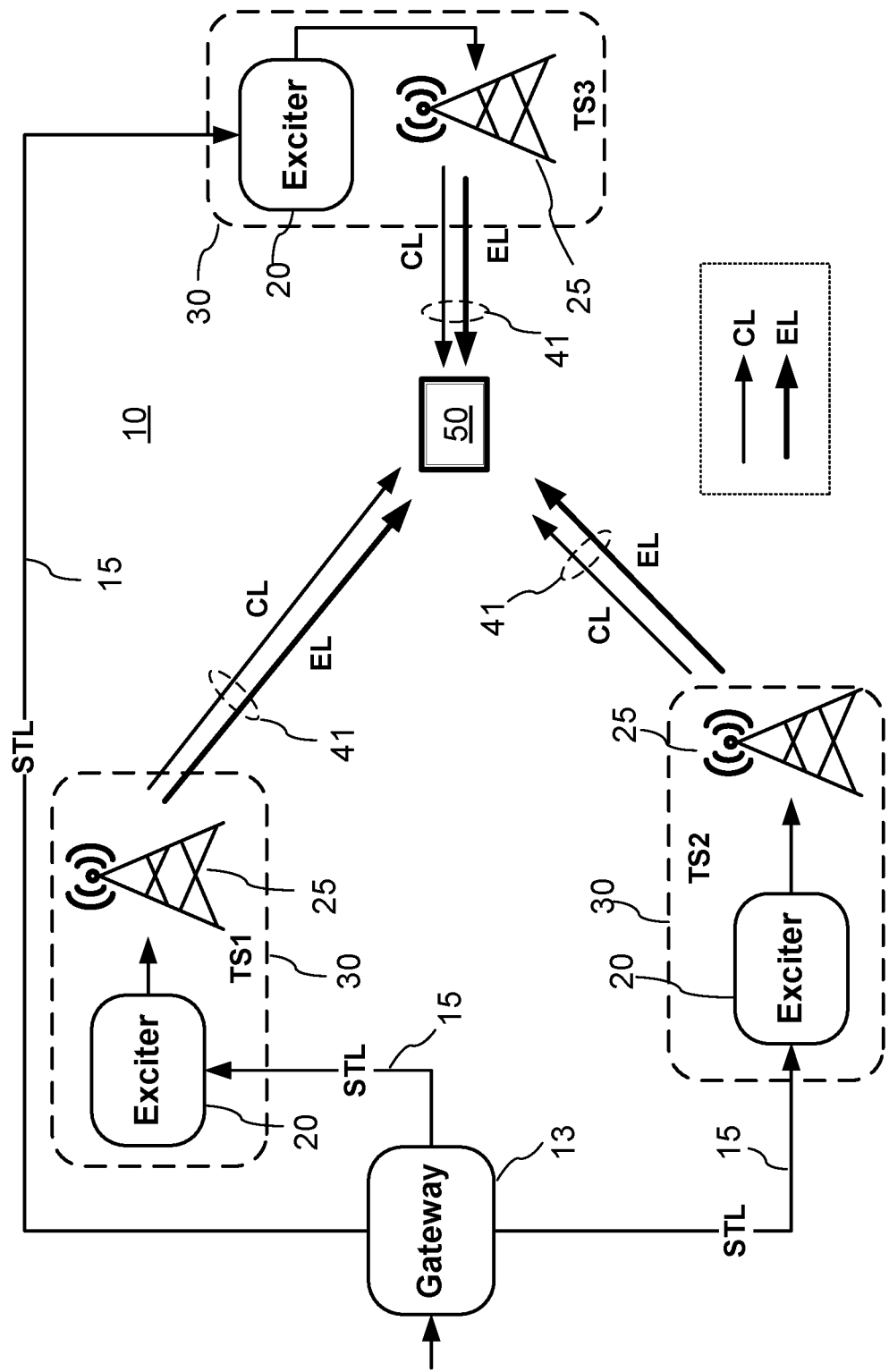
FIG. 1 is a schematic diagram of a SFN implementing LDM for transmitting services in two LDM layers, with dedicated backhaul links to each transmitter.

In the following description, for purposes of explanation and not limitation, specific details are set forth, such as particular circuits, circuit components, techniques, etc. in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the example embodiments. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated by those skilled in the art that block diagrams herein can represent conceptual views of illustrative circuitry embodying the principles of the technology. The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Note that as used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. The terms "multicast", "multicasting", and their derivatives encompasses broadcasting as well as casting to a subset of end-users. Backhaul signals or data delivered in-band from one transmission station of a multicast system to another may be referred to as in-band backhaul or as relay backhaul. The term "in-band", when used with reference to a transmission signal carrying service signals to end-users, is used to mean transmitting within a frequency band of the service signals, or within a frequency band that at least partially overlaps the frequency band of the service signals.

An aspect of the present disclosure relates to a wireless multicast communication system (MCS), and components thereof, that includes a plurality of transmitter stations (TS), at least some of them configured to transmit service data or signals using layered division multiplexing (LDM), and which uses an in-band communication channel to transmit backhaul data with an LDM transmission signal to at least some of the transmitter stations. Transmitter stations that are equipped to receive the LDM transmission signals carrying in-band backhaul data may be referred to as relay transmission stations (RTS) or in-band relay stations (IBRS). An aspect of the present disclosure relates to a method for operating a wireless MCS that employs LDM transmission signals to transmit services to end-users. The method includes transmitting backhaul signals comprising service data to one or more transmission stations of the MCS in-band with at least one of the LDM transmission signals, which may also carry the service data to end-users.

According to one or more aspects of the present disclosure, an MCS may comprise a primary transmitter station (PTS) and a first relay transmitter station (RTS). The PTS may be configured to wirelessly transmit a first transmission (Tx) signal that comprises a first (L1) signal layer and a second (L2) signal layer, wherein the L2 signal layer is superimposed over the L1 signal layer using layered division multiplexing (LDM). The L1 signal layer of the first Tx signal may comprise L1 service signals carrying first service data to end-users. The PTS may be further configured to include in-band backhaul (IBBH) signals in the first Tx signal. The RTS may be configured to receive a relay signal comprising the first Tx signal, extract the IBBH signals contained in the first Tx signal, and transmit a second Tx signal comprising backhaul service data obtained from the IBBH signals.

In some implementations the first Tx signal and the second Tx signal may be transmitted over a same carrier frequency so as to share wireless spectrum, the backhaul service data may comprise the first service data, and the PTS may be configured to transmit at least a portion of the IBBH signals comprising the first service data ahead of transmitting the L1 service signals by a lead time T; the lead time T may be selected so as to synchronize transmission of the first service data by the PTS and the first RTS. In some implementations the PTS may be configured to transmit L2 service signals comprising second service data in the L2 signal layer, and the IBBH signals may comprise the second service data.

In some implementations the first RTS may comprise: a receive (Rx) antenna configured to receive the relay signal, a relay receiver, an exciter, and a transmit (Tx) antenna configured to transmit the second Tx signal. The Rx relay receiver may be configured to perform signal equalization on the received relay signal, to retrieve a portion of the first Tx signal comprising the IBBH signals, and to extract the backhaul service data therefrom. The exciter may be configured to generate a second Tx signal waveform based on the backhaul service data extracted from the first Tx signal.

In some implementations at least one of the following conditions holds: the Tx antenna of the first RTS is located in a minimum of a reception pattern of the Rx antenna, or the Rx antenna is located in a minimum of a transmission pattern of the Tx antenna or in a shadow of an object that at least partially shields the Rx antenna from the Tx antenna.

In some implementations the first Tx signal and the second Tx signal may share wireless spectrum, and the relay receiver may be configured to estimate a loopback signal from the Tx antenna to the Rx antenna of the first RTS, and to cancel a contribution of the loopback signal from the received relay signal or a signal obtained therefrom. In some implementations the exciter may be configured to insert a distinct training signal in the second Tx signal waveform, and the relay receiver may be configured to perform a loopback channel estimation using the distinct training signal.

In some implementations the PTS may be configured to transmit the IBBH signals in the L2 signal layer, and the first RTS may be configured to perform signal processing operations comprising: cancelling the L1 signal layer from the received relay signal, or a signal obtained therefrom, to obtain a first remainder signal comprising the L2 signal layer of the first Tx signal; detecting the IBBH signals in the first remainder signal and extracting the first service data therefrom; and encoding the first service data for transmitting with the second Tx signal. In some implementations the first Tx signal and the second Tx signal may share wireless spectrum, and the first RTS may be further configured to: perform a combined forward and loopback channel estimation and equalization of the received relay signal, and perform a forward channel estimation and equalization of the first remainder signal, or a signal obtained therefrom, to obtain the L2 signal layer of the first Tx signal.

In some implementations the PTS and the first RTS may be each configured to transmit L2 service signals in the L2 signal layer, the L2 service signals comprising second service data, and the PTS may be further configured to include the second service data into the backhaul service data carried by the IBBH signals. The first RTS may be further configured to perform signal processing operations comprising: a loopback channel estimation to estimate a contribution of the second Tx signal in the first remainder signal; cancelling the contribution of the L2 signal layer of the second Tx signal from the first remainder signal to obtain a second remainder signal comprising the L2 signal layer of the first Tx signal; detecting the IBBH signals in the L2 signal layer of the first Tx signal; and, encoding the first service data extracted from the L2 signal layer of the first Tx signal for transmitting in the L1 signal layer of the second Tx signal, and encoding the second service data extracted from the L2 signal layer of the first Tx signal for transmitting with the L2 layer of the second Tx signal.

In some implementations the PTS may be configured to transmit the IBBH signals in a backhaul time slot, the first Tx signal may be absent of the first service signals in the backhaul time slot, and the first RTS may be configured to perform signal processing operations comprising: a loopback channel estimation to estimate a contribution of the second Tx signal into the relay signal in the backhaul time slot; cancelling the contribution of the second Tx signal into the received relay signal in the backhaul time slot; a detection of the IBBH signals in the backhaul time slot containing the backhaul service data; and an encoding of the backhaul service data for transmitting with the second Tx signal. In some implementations the detection of the IBBH signals may comprise forward channel estimation and equalization.

In some implementations the first RTS may be configured to distinguish between the first Tx signal and the second Tx signal in the relay signal based on a transmitter identification (TxID) signal contained in one of the first Tx signal or the second Tx signal.

In some implementations the PTS may be configured to transmit the IBBH signals in a backhaul time slot, and the first RTS may be configured to: transmit the second Tx signal comprising a distinct training signal in the backhaul time slot, and to perform loopback signal estimation based on the distinct training signal.

In some implementations the PTS may comprise a multi-element transmit antenna configured for selective MIMO transmission, the Rx antenna of the first RTS may be configured for selective MIMO reception, the PTS may be configured to perform selective MIMO encoding of the backhaul service data onto a MIMO transmission block of the first Tx signal, and the first RTS may be configured to identify the MIMO transmission block of the first Tx signal and to perform MIMO decoding of the backhaul service data therefrom.

In some implementations the PTS may be configured to transmit at least a portion of the IBBH signals in a third LDM layer of the first Tx signal.

In some implementations the MCS may further comprise a second RTS, and the first RTS may be configured to include the backhaul service data, or at least a portion thereof, into the second Tx signal as re-transmitted backhaul data; the second RTS may be configured to receive the second Tx signal, to extracted therefrom the re-transmitted backhaul data, and to transmit a third transmission (Tx3) signal comprising service data contained in the re-transmitted backhaul data.

In some implementations the first RTS may be configured to transmit the second Tx signal at a same carrier frequency it receives the IBBH signals. In some implementations the PTS and the first RTS may be configured to transmit at different carrier frequencies.

One or more aspects of the present disclosure relate to a relay transmitter station (RTS) for a wireless multicast communication system comprising a plurality of transmitter stations configured to transmit service data to users over a same carrier frequency, the RTS comprising a receive (Rx) antenna, a relay signal processor, and a Tx antenna. The Rx antenna may be configured to receive a relay signal comprising a first transmission (Tx) signal, the first Tx signal comprising a first (L1) signal layer and a second (L2) signal layer, wherein the L2 signal layer is superimposed over the L1 signal layer using layered division multiplexing (LDM), wherein the L1 signal layer comprises L1 service signals carrying first service data, wherein the first Tx signal further includes in-band backhaul (IBBH) signals data comprising backhaul service data. The relay signal processor may be configured to extract the backhaul data from the received relay signal. The Tx antenna may be configured to transmit a second Tx signal comprising the backhaul service data.

One or more aspects of the present disclosure relate to a method for operating a wireless multicast communication system (MCS) comprising a plurality of transmitter stations (TSs) configured to transmit services to end-users over a same carrier frequency. The method may comprise: a) generating, at a first TS from the plurality of TSs, a first transmission (Tx) signal carrying service signals to end users using layered division multiplexing (LDM), and including in the first Tx signal in-band backhaul (IBBH) signals carrying backhaul service data, and b) wirelessly transmitting the first Tx signal. The method may further comprise, at a second TS from the plurality of TSs, c) wirelessly receiving a relay signal comprising the first Tx signal, d) performing channel estimation to extract a portion of the first Tx signal comprising the IBBH signals, e) retrieving the backhaul service data contained in the IBBH signals, and, f) wirelessly transmitting a second Tx signal comprising the backhaul service data.

FIG. 1 illustrates a wireless multicast communication system (MCS) 10 that delivers services to end-users 50 from a plurality of transmitter stations (TS). MCS 10 may be for example a terrestrial digital TV SFN configured to operate in accordance with ATSC 3.0 standards. In the illustrated example MCS 10 includes three TSs 30 that are labeled "TS1", "TS2", and "TS3". Each TS 30 includes an exciter 20 and a transmit (Tx) antenna 25 which may be located on a transmission tower. A broadcast gateway (BGW) 13 is responsible for sending backhaul (BH) information to each TS 30 via dedicated backhaul links 15. The backhaul information includes service data for the network-provided services. Backhaul signals carrying the backhaul information to each TS 30 via backhaul links 15 may be defined in accordance with a Studio-to-Transmitter Link (STL) interface, for example as specified in the ATSC 3.0 Standards. Accordingly, the backhaul links 15 may also be referred to as STL links, and the backhaul information or data may be referred to as the STL information or STL data, respectively. The backhaul information may also include control information that determines transmission parameters in the network, such as transmission timing offsets, frequency offsets, transmission power, etc. Exciters 20 generate transmission waveforms based on the backhaul information using a suitable communication format, for example as defined by ATSC 3.0, and feed them to the Tx antennas 25 for broadcasting as wireless transmission (Tx) signals 41.

MCS 10 may be configured to deliver mixed mobile and fixed services using LDM technology. LDM is a multi-layer non-orthogonal signal multiplexing technology which is adopted by the ATSC 3.0 standard, and in which signals carrying different types of services are superimposed in layers, for example combined at different power levels. LDM allows achieving higher cumulative transmission capacity when delivering multiple services with different quality requirements. In a typical application scenario for a two-layer LDM, the higher-power layer, which is termed Core Layer (CL) in ATSC 3.0, may be configured to deliver robust signals, targeting mobile, handheld, and indoor receivers. A second layer with relatively lower power is termed Enhanced Layer (EL) in ATSC 3.0, and may be used for example to deliver high-throughput signals to fixed receivers with roof-top or other powerful antenna systems, which can provide high signal-to-noise ratio (SNR) conditions for received signals of relatively low power. EL signals may also target a localized high-density area with limited coverage distance. Aspects of LDM technology are described in U.S. Pat. No. 9,479,826, which is assigned to the assignee of the present application, and which is incorporated herein by reference.

MCS 10 may represent a conventional ATSC 3.0 SFN, in which STL links 15 may be implemented using either optical fiber links or dedicated wireless microwave links. Deploying each additional TS 30 requires adding an STL link 15 to deliver the service data and control signaling from the BGW 13. However optical fiber links are not always available at desired locations, and are expensive to rent. Dedicated microwave backhaul equipment may also be expensive to install. Furthermore additional microwave spectrum, which may be required for backhaul data transmission over a dedicated wireless link, is a scarce resource for wireless broadband services.

Wireless in-band distribution of backhaul information to newly added TS may be a promising alternative solution for deployments of high-throughput wireless broadcast and multicast communication systems, and may offer both low infrastructure and operational costs and high spectrum efficiency. Considering by way of example an ATSC 3.0 SFN that makes use of the advanced high-efficiency video coding (HEVC) and LDM technology, the transmission capacity of an ATSC 3.0 SFN is significantly higher than that of previous-generation DTV systems. The increased capacity associated with the LDM provides an opportunity to deliver both backhaul data to a remote or newly-added TS and service data to end-users using the same TV spectrum, an approach that may be referred to as in-band backhaul delivery.

Figure 2:
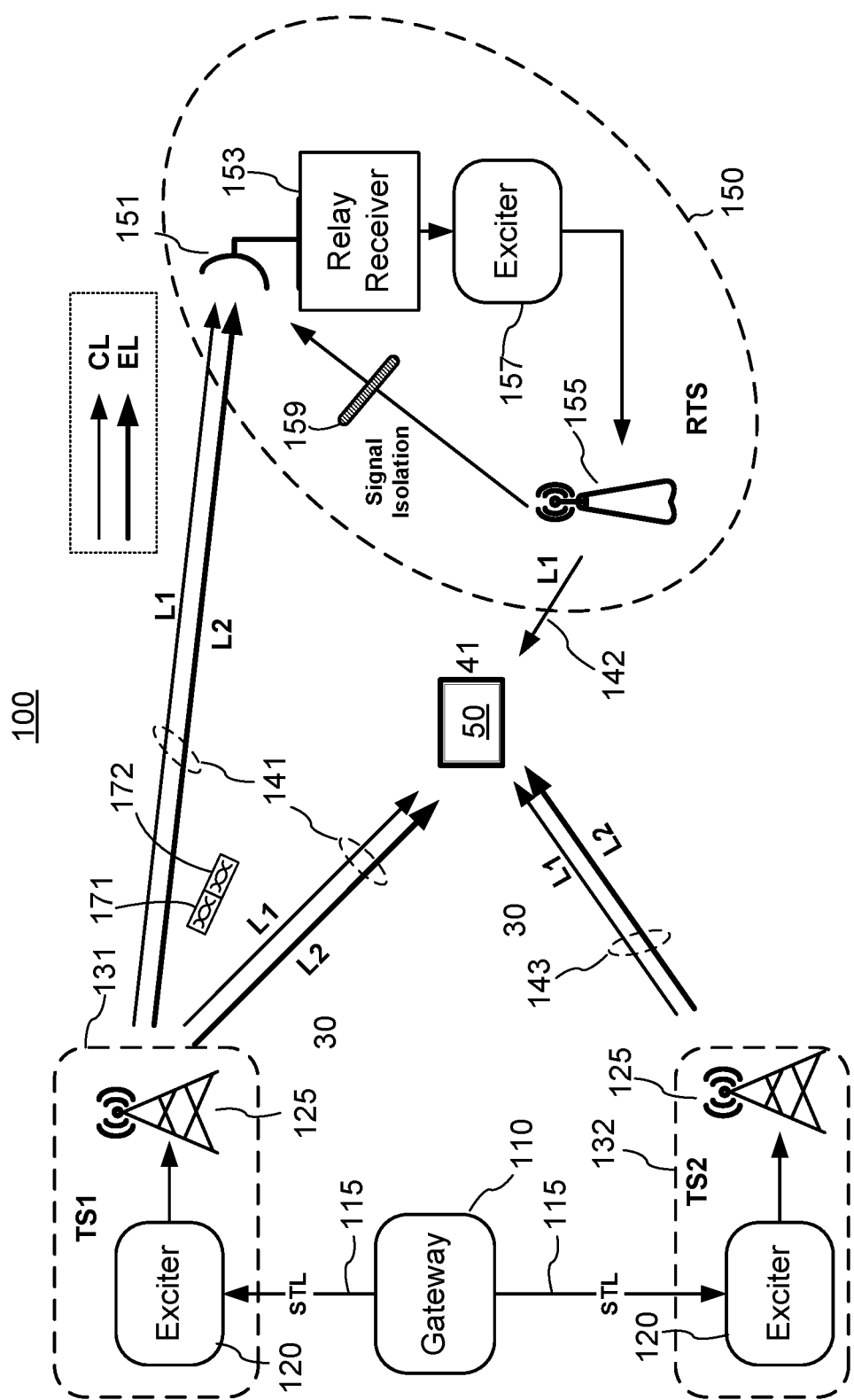
FIG. 2 is a schematic diagram of an example multicast communication system (MCS) implementing LDM and in-band transmission of backhaul data to one of the transmitters, termed "relay transmission station" (RTS) according to an embodiment.

FIG. 2 illustrates an example MCS 100 in which backhaul data to one of the transmitter stations (TSs) is delivered in-band, i.e. with an LDM transmission (Tx) signal that is wirelessly transmitted by another TS and that also carries service data to customers. Similarly to MCS 10, MCS 100 may operate as a SFN and includes a plurality of TSs that are configured to wirelessly cast service signals carrying same, or at least partially overlapping, services to end-users 50 over a same carrier frequency. In the illustrated embodiment the plurality of TSs is represented by a first TS (TS1) 131, a second TS (TS2) 132, and a third TS 150. A broadcast gateway (BGW) station 110 provides backhaul information to the first TS 131 and the second TS 132 via dedicated wired or wireless backhaul links 115. The backhaul information may contain service data for one or more services, and may further include transmission control parameters that may be specific to respective TSs.

The first TS 131 and the second TS 132 include each an exciter 120 coupled to a Tx antenna 125, and are configured to wirelessly transmit transmission signals 141, 143 carrying the service data received in the backhaul to end-users 50 located in the coverage areas of respective TSs, which may overlap. The third TS 150 may be deployed where no dedicated backhaul link is available, for example at a remote location. Instead of deploying a dedicated backhaul link, backhaul information may be delivered to the third TS 150 in-band with the transmission (Tx) signal 141 that is emitted by the first TS 131. The Tx signal 141 emitted by the first TS 131 thus may comprise service signals 171 carrying services to the end-users 50 and in-band backhaul (BH) signals 172 carrying BH data, which are to be re-transmitted as service signals by another TS. The transmission signal 141 may also be referred to herein as the first Tx signal 141 or the Tx1 signal 141. The first TS (TS1) 131 that transmits the in-band backhaul may also be referred to herein as the primary TS (PTS) 131.

In order to receive and process the in-band backhaul (IBBH) signals 172, the third TS 150 includes a receive (Rx) antenna 151 coupled to a relay receiver 153, which connects to a Tx signal generator 157, which in turn connects to a Tx antenna 155. The third TS 150 may also be referred to hereinafter as the relay transmitter station (RTS) 150, or as the first RTS 150. The Tx signal generator 157 of RTS 150 may in some embodiments be configured to perform generally the same functions as the exciters 120 of PTS 131 and TS2 132, i.e. to form a transmission waveform based on backhaul data or signals, and may also be referred to as the exciter 157. The Rx antenna 151 of RTS 150 may be positioned where it can receive the Tx1 signal 141, for example in the line of sight (LOS) from the Tx antenna 125 of the TS1 131. The relay receiver 153 of RTS 150 may be configured to extract the IBBH signals 172 from the Tx1 signal 141 received by the Rx antenna 151. The exciter 157 of RTS 150 may be configured to generate transmission waveforms based on service data carried with the IBBH signals 172, and feed them to the Tx antenna 155, which is configured to wirelessly transmit the transmission waveforms as a second transmission (Tx2) signal 142 to end-users 50 located in a coverage area of the Tx antenna 155. In some embodiments the PTS 131 and RTS 150 may transmit service signals to different end-users.

The Tx1 signal 141 carrying backhaul data to RTS 150 may be formed using LDM to have at least two LDM layers, a first LDM layer "L1" and a second LDM layer "L2". The first LDM layer may be referred to herein as the L1 signal layer or simply as the L1 layer. The second LDM layer "L2" may be referred to herein as the L2 signal layer or simply as the L2 layer. The L1 layer may include L1 signals L1(t). The L2 layer may include L2 signals L2(t). The L1 signals may include L1 service signals carrying first service data, which may be referred to as L1 service data, to the end-users 50. In some embodiments the L2 signals may include L2 service signals carrying second service data, which may be referred to as L2 service data, to the end-users 50. In accordance with the LDM technique, the L2 signals may be superimposed over L1 signals at a lower power level. By way of example, L2 signals may be at least 5 dB lower, or at least 10 dB lower in power than the L1 signals in the Tx1 signal 141. In some embodiments the higher-power L1 layer may correspond to the CL defined in ATSC 3.0, while the lower-power L2 layer may correspond to the EL defined in ATSC 3.0. In some embodiments the higher-power L1 layer may be configured to deliver robust signals carrying mobile broadcast services (MBS) for mobile, handheld, and indoor receivers. The lower-power L2 layer may be configured to deliver high-throughput signals carrying fixed broadcast services (FBS) to users with fixed roof-top or other powerful antenna systems, which can provide high signal-to-noise radio (SNR) conditions. The L2 layer signals may also target a high-density localized area with limited coverage distance. Other systems may use different allocation of services between the L1 and L2 layers. In some embodiments the L2 layer signals may be superimposed over the L1 layer signals at a substantially same power level. In this case, L1 signals may be configured with a negative SNR threshold to achieve good signal detection. For example, ATSC 3.0 defines the power injection level of L2 layer signals relative to L1 layer signals from 0 to −25 dB, in steps of 0.5 dB.

Figure 3:
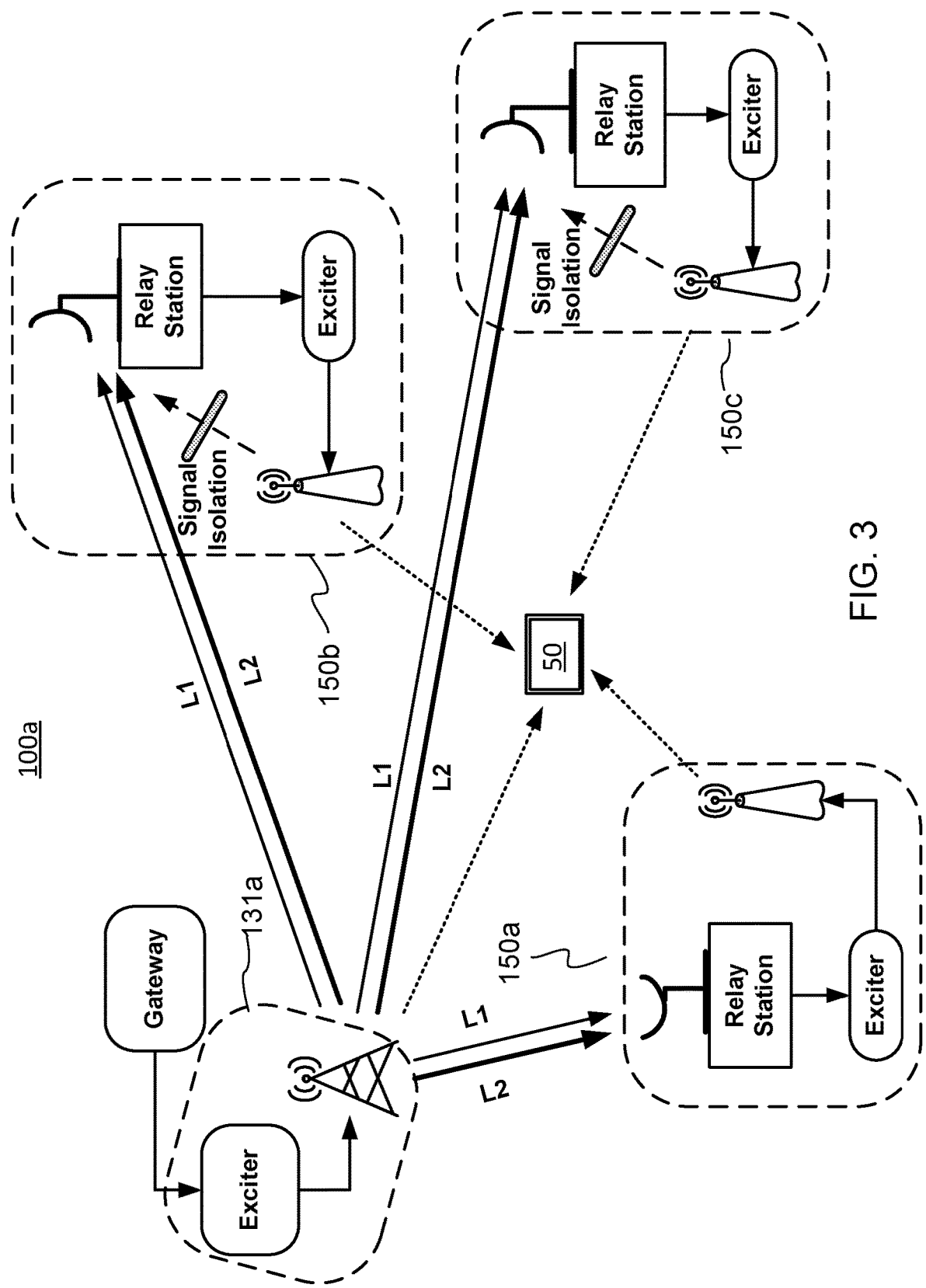
FIG. 3 is a schematic diagram of an example MCS implementing LDM and in-band multicasting of backhaul data to multiple RTS from a same primary transmitter.

Referring to FIG. 3, in some embodiments a PTS may serve backhaul signals to a plurality of RTS. FIG. 3 illustrates an implementation of MCS 100, which may be referred to as MCS 100*a*, and in which multiple RTS receive backhaul data in-band from a PTS 131*a*. The PTS 131*a*, which may be an embodiment of PTS 131 of FIG. 2, receives backhaul data from a backhaul gateway using a dedicated backhaul link, and transmits the backhaul data in-band, incorporating it into a wireless LDM transmission signal that delivers services to the end-users 50. In the illustrated example, MCS 100*a* includes three RTSs 150*a*, 150*b*, and 150*c*, each of which may be an embodiment of RTS 150 of FIG. 2, and have an Rx antenna located within a coverage area of the PTS 131*a*. It will be appreciated that MCS 100 or 100*a* may generally include one or more primary TSs that receive backhaul data over dedicated backhaul link(s) and which may transmit the backhaul data, or a portion thereof, in-band with their transmission signals, and that MCS 100 or 100*a* may further include one or more RTS that are configured to extract backhaul data from the transmission signals of other TS in the same SFN.

Figure 4:
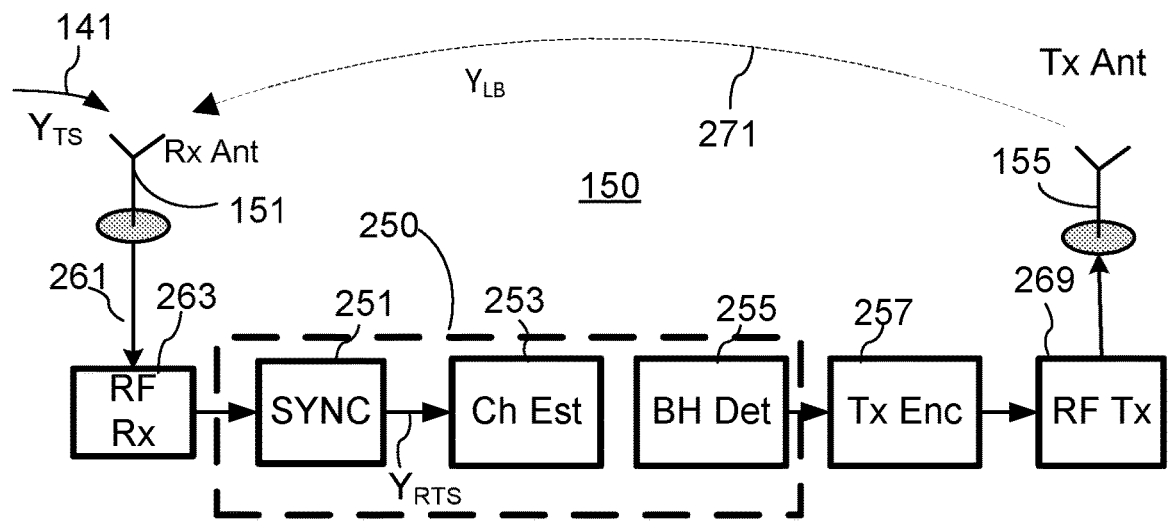
FIG. 4 is a schematic block diagram of an RTS configured to re-transmit services received via in-band backhaul.

FIG. 4 illustrates a functional block scheme of RTS 150 according to an embodiment. The Rx antenna 151 may be coupled to a radio frequency (RF) receiver (RF Rx) 263, which is operationally followed by a backhaul (BH) processor 250, a Tx signal encoder 257, and an RF transmitter (RF Tx) 269 in sequence. The RF Tx 269 is operationally coupled to the Tx antenna 155. In operation the Rx antenna 151 receives a wireless relay signal and converts it to a wired electrical relay signal 261, which is provided to the RF Rx 263. The RF Rx 263 may be configured to perform initial processing of the received electrical signal, such as frequency down-conversion, RF channel tuning, filtering, amplifying, performing automatic gain control, and analog-to-digital conversion. The BH processor 250 may be configured, for example programmed, with one or more signal processing modules tasked to detect and extract the IBBH signal 172 from the received signal. In the illustrated embodiment the BH processor 250 includes a time synchronization (SYNC) module 251, a channel estimation and equalization (CEE) module 253, and a backhaul detection module 255. The SYNC module 251 may be configured to perform timing and/or frequency synchronization of the received electrical signal; the signal it outputs serves as an input signal to the BH processing that follows and may be denoted as $Y_{RTS}$ or $Y_{RTS}(t)$. The CEE module 253 may be configured to perform channel estimation and channel equalization and, in some embodiments, cancellation of one or more signal layers and/or a loopback signal as described below. The backhaul detection module 255 may be configured to detect the backhaul signal in an output signal of the CEE module 253. Backhaul data extracted by the BH detector module 255 are provided to the Tx signal encoder 257 for channel and/or modulation encoding and generating a transmission waveform. The RF Tx 269 is configured to convert the transmission waveform, which may be generated by the Tx signal encoder 257 digitally, into an RF signal which is wirelessly transmitted by the Tx antenna 155 as the Tx2 signal 142 of FIG. 2. Signal processing modules 251, 253, 255, and 257 are functional units that may be embodied in software, in hardware logic, or as a combination thereof, and may be implemented using a single hardware processor or a combination of hardware processors. The RF Rx 263 and the BH processor 250 may be an embodiment of the relay receiver 153 of RTS 150 in FIG. 2. The Tx signal encoder 257 and the RF Tx 269 may embody the Tx signal generator 157 of RTS 150 of FIG. 2, also referred to as the exciter 157.

Figure 5A:
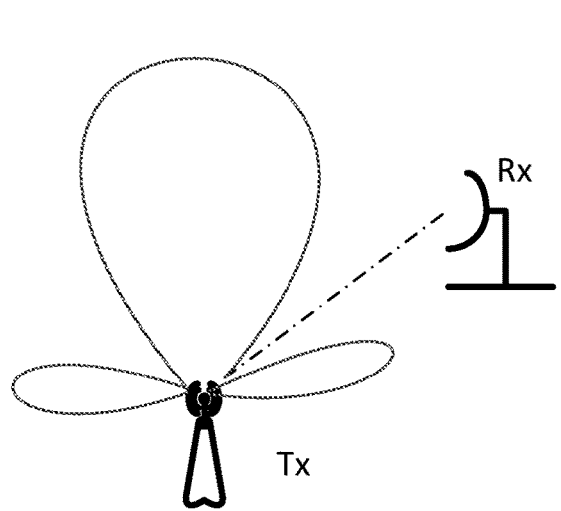
FIG. 5A is a schematic diagram showing an Rx antenna of an RTS disposed in a transmission minimum of the Tx antenna of the RTS.
Figure 5B:
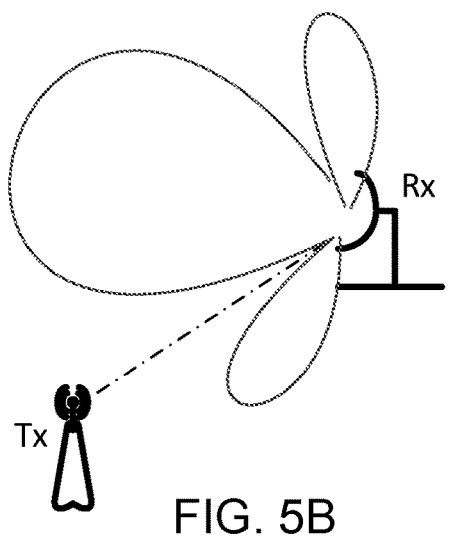
FIG. 5B is a schematic diagram showing a Tx antenna of an RTS disposed in a minimum of a reception pattern of the Rx antenna of the RTS.

The Rx antenna 151 and the Tx antenna 155 of RTS 150 may be located relatively close to each other, so that a fraction of the signal emitted by the Tx antenna 155, termed loopback (LB) signal, may be received by the Rx antenna 151, causing interference and potentially complicating the BH signal detection. To lessen the interference from the loopback signal and facilitate successful detection of the in-band BH signal, RTS 150 may be configured to provide signal isolation between the Rx and Tx antennas of RTS 150. Numerical analysis and simulations show that signal isolation between the Tx and Rx antennas of RTS 150 about 100 dB may be sufficient for successful backhaul detection in a typical network environment. Such signal isolation levels may be achieved using various approaches. In some embodiments the Rx antenna 151 may be positioned in a shadow of a signal isolation barrier 159 with respect to the emission from the Tx antenna 155. In some embodiments a radiation pattern of the Tx antenna 155 of RTS 150 may be configured so that the Rx antenna 151 is located at a minimum of the transmission radiation pattern of the Tx antenna 155 as illustrated in FIG. 5A, or the Rx antenna 151 disposed in the Tx transmission pattern minimum. In some embodiments the Rx antenna 151 may disposed at an angular location away from a direction of maximum transmission strength of the Tx antenna 155, where the Tx transmission power pattern is at least 10 dB lower than at the maximum thereof. In some embodiments a reception sensitivity pattern of the Rx antenna 151 of RTS 150, or the location of the Tx antenna 155, may be configured so to that the Tx antenna 155 is located at a minimum of the reception sensitivity pattern of the Rx antenna 151 as illustrated in FIG. 5B, or where the reception sensitivity pattern of the Rx antenna 151 is at least 10 dB lower than at the maximum thereof. In some embodiments a combination of two or more of these approaches may be employed.

In some embodiments the residual loopback signal 271 may still be comparable in strength to the Tx1 signal 141 received by the RTS, potentially complicating the detection of the backhaul signal. The received relay signal $Y_{RTS}$ of the RTS 150 may be described in terms of the loopback (LB) channel $H_{LB}$ and the forward (FWD) channel $H_{fwd}$:

$$Y_{RTS} = X_{TS} * H_{fwd} + X_{RTS} * + H_{LB} + N_0 = Y_{TS} + Y_{LB} + N_0 \quad (1)$$

where $X_{TS}$ denotes the Tx1 signal 141 as generated by the TS1 131, $Y_{TS}$ denotes the Tx1 signal 141 as received at the BH processor of the RTS 150, $Y_{LB}$ denotes the Tx2 signal as received at the BH processor 250 of the RTS 150 via the Rx antenna 151, and $N_0$ describes noise. In some embodiments the CEE module 253 of the BH processor 250 may be configured to perform loopback signal cancellation to obtain an estimate $\hat{Y}_{TS}$ of the received Tx1 signal $Y_{TS}$, which may be preceded by loopback channel estimation to obtain a loopback channel estimate $\hat{H}_{LB}$:

$$\hat{Y}_{TS} = Y_{RTS} - X_{RTS} * \hat{H}_{LB} = X_{TS} \cdot H_{fwd} + X_{RTS} \cdot (H_{LB} - \hat{H}_{LB}) + N_0 \quad (2)$$

To assist with the loopback channel estimation, RTS 150 may include in the Tx2 signal 142 it emits a signature signal that may be unique to the RTS at least within a signal reception area thereof. In some embodiments, the CEE module 253 of the BH processor 250 may be configured to perform forward channel estimation to obtain a forward channel estimate $\hat{H}_{fwd}$ and to perform forward channel equalization to obtain an estimate $\hat{X}_{TS}$ of the Tx1 signal 141 as generated at the PTS 131, or at least a portion thereof that contains the IBBH signal 172:

$$\hat{X}_{TS} \approx \hat{Y}_{TS} / \hat{H}_{fwd} \quad (3)$$

Figure 6:
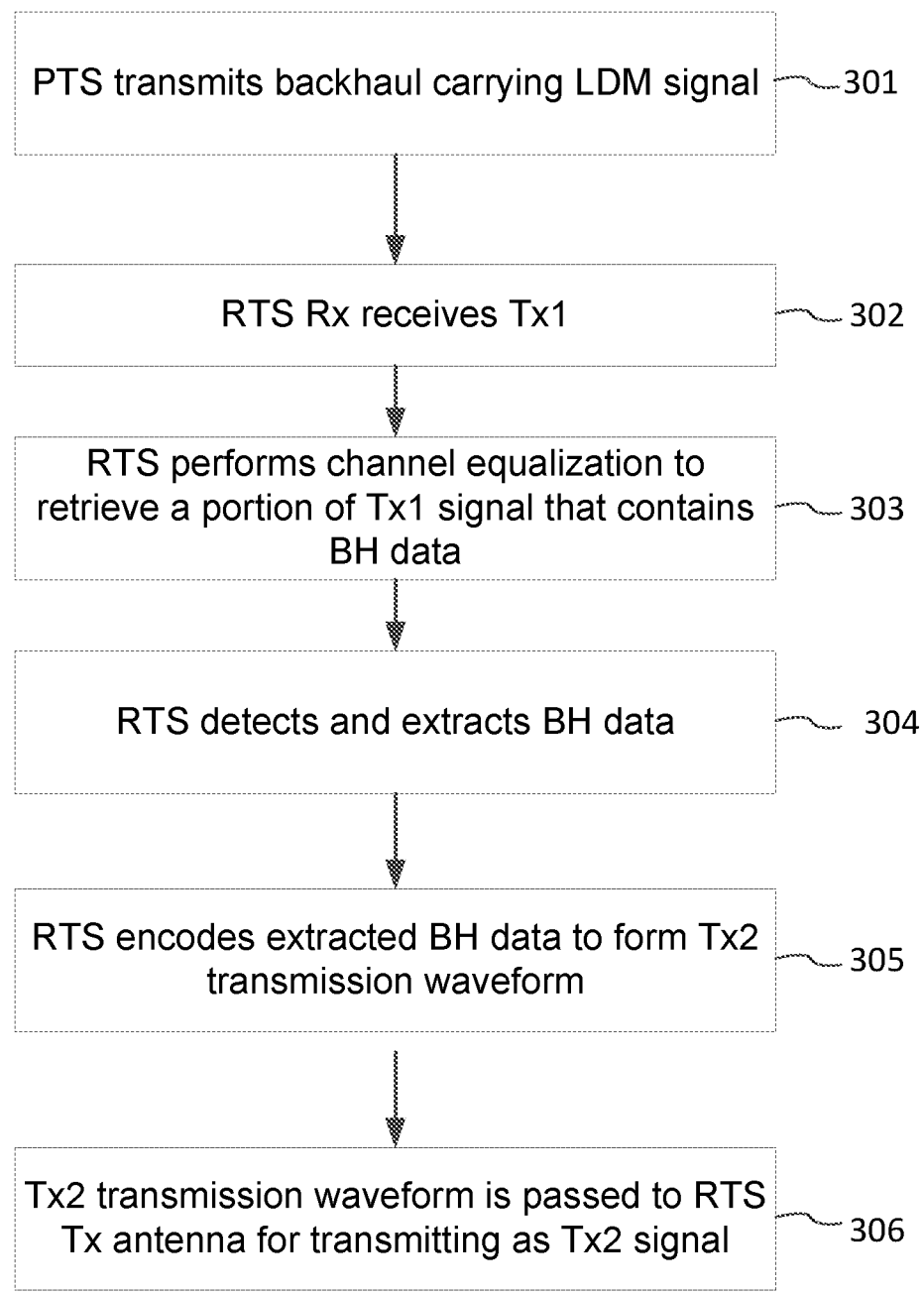
FIG. 6 is a flowchart of a method for operating an MCS with in-band backhaul delivery.

Referring now to FIG. 6, MCS 100 may implement method 300 to deliver services to end-users in the service area of RTS 150. Each block 301-306 in the flowchart may represent a step or operation that may be performed by components of the MCS 100. The operation of MCS 100 in accordance with method 300 may be described as follows. At block 301, PTS 131 generates the Tx1 signal 141 using LDM and including both service and backhaul signals 171, 172 in the transmission. The Tx1 signal 141 may include L1 layer signals and L2 layer signals, with at least the L1 layer signals comprising service signals directed to end-users. In some embodiments the L1 layer signals may carry first service data (L1 data), L2 layer signals may carry second service data (L2 data), with the Tx1 signal 141 further including IBBH signals 172 carrying at least one of the first and second service data. The IBBH signals 172 may also include transmission control information such as transmission timing and transmission power level parameters for use by the exciter 157 and the Tx antenna 155 in generating and transmission the Tx2 signal 142.

At block 302, the Rx antenna 151 of RTS 150 receives a wireless relay signal comprising the Tx1 signal 141, and converts it to a wired electrical signal, which may be suitably conditioned and then passed to the BH processor 250. At block 303, the CEE module 253 of the BH processor 250 may perform one or more channel equalization operations to retrieve a portion of the Tx1 signal that contains the IBBH signal 172. At block 304, the BH detector module 255 of the BH processor 250 detects the IBBH signal and extracts backhaul data therefrom. At step 305, the Tx signal generator 157 obtains the L1 service data and/or L2 service data from the extracted backhaul data, and performs suitable channel and/or modulation coding to form a Tx2 transmission waveform. At step 306, the Tx antenna 155 wirelessly transmits the Tx2 transmission waveform as the Tx2 signal. In at least some embodiments, RTS 150 may re-transmit, with the Tx2 signal 142, one of the first and second service data at a same carrier frequency the PTS 131 transmits the IBBH signals 172.

Services that PTS 131 and RTS 150 transmit to end-users 50 may at least partially overlap. Accordingly the transmission of common service signals by PTS 131 and RTS 150 may be synchronized so that they are received by the end-users 50 generally at the same time. To time-synchronize the reception of the corresponding transmitter signals from the RTS and the PTS, PTS 131 may transmit the backhaul signal earlier than the corresponding service signal. This transmission timing difference T, which may be referred to herein as the lead time T, may be equal or greater than the sum of the Tx1 signal propagation time to RTS 150 and the backhaul data processing time at RTS 150 involved in performing the steps or operations 302-306 of method 300. In some embodiments the lead time T of the backhaul transmission may be set at one transmission frame, such as for example at one ATSC 3.0 frame, or at a multiple of the frame durations. It may also be set at any other suitable time advance that allows RTS 150 the time needed to decode the backhaul signal and re-encode the transmission waveform of the Tx2 signal to enable time synchronized SFN emission by PTS 131 and RTS 150.

Backhaul data may be transmitted by PTS 131 in a variety of ways. In some embodiments, specific LDM layers of the Tx1 signal 141 may be used to transmit service signals of different types. In some embodiments, one LDM layer of the Tx1 signal 141 may be used to transmit backhaul data for services transmitted in another LDM layer. In some embodiments, the backhaul data may be transmitted using time division multiplexing in a single-layer TDM block of the Tx1 signal 141. In some embodiment, the backhaul data may be transmitted in a different LDM layer than corresponding service signals. In some embodiments, the backhaul data may be transmitted in a dedicated LDM layer of the Tx1 signal 141. In some embodiments the backhaul data delivered with the LDM signal may use more spectrum efficient modulation and channel coding than the same-layer service signals targeting the end-users 50. The LDM technology provides an efficient and flexible way to use part of the transmitter data capacity for in-band backhaul data distribution.

FIGS. 7A-10 relate to an embodiment wherein PTS 131 transmits first service signals 210 in the L1 layer and second service signals 220 in the L2 layer of the Tx1 signal, while RTS 150 transmits only the first service signals 210 to end-users 50 in its service area. The first service signals 210 may be referred to as the L1 service signals 210, and the second service signals 220 may be referred to as the L2 service signals 220. IBBH signals 221 carrying backhaul data "L1BH" for the L1 service signals, which may be referred to as the L1BH signals 221, are transmitted in the L2 layer of the Tx1 signal. The L1 and L2 service signals 210, 220 may embody the service signals 171 of the Tx1 signal 141, while the L1BH signals 221 may embody the IBBH signals 172 of the Tx1 signal 141 described above with reference to FIGS. 2-6. The L1 service signals 210 may correspond for example to mobile-broadcast services (MBS) that require more robust signal delivery and thus are transmitted in the higher-power L1 layer, while the L2 service signals 220 may correspond to fixed-broadcast services (FBS) targeting end-users with higher-power fixed antennas, such as DTV. Thus RTS 150 in this embodiment may be providing MBS for mobile customers in a remote area that is absent of fixed DTV antennas, and may be transmitting the Tx2 signal 142 with the MBS in the L1 signal layer and an empty L2 layer, or effectively as a single-layer transmission signal.

By way of example, in one example scenario where the L1 service signals may be encoded with QPSK and rate 6/15 code, the L2 service signals may be encoded with 64QAM with rate 10/15 code, the L1BH signals 221 may only occupy about 20% of the L2 layer capacity. Table 1 summarizes example fractions of EL (L2) layer capacity, in percent, that may be occupied by the CL (L1) backhaul transmission of mobile services for different modulation and channel coding service scenarios.

TABLE 1

| Scenario | Mobile throughput (Mbps) | EL backhaul configuration | | | | |
|---|---|---|---|---|---|---|
| | | 50% | 25% | 15% | 10% | 5% |
| 1 | 2.7 | 16QAM, L-4/15 | 16QAM, L-7/15 | 64QAM, L-9/15 | 256QAM, L-8/15 | 1k-QAM L-13/15 |
| 2 | 4.1 | 16QAM L-6/15 | 64QAM L-8/15 | 256QAM L-10/15 | 1k-QAM L-12/15 | NA |

Figure 7A:
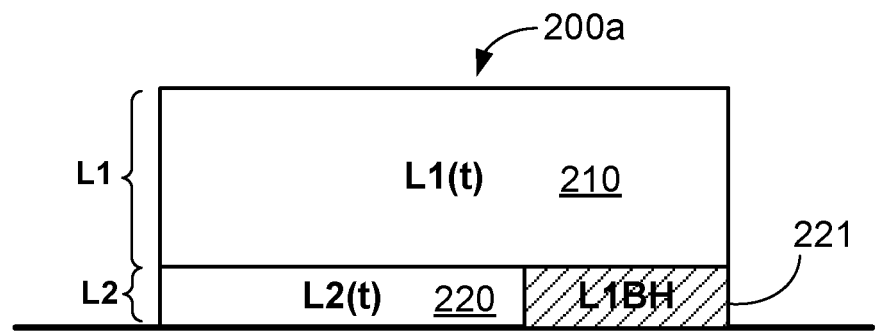
FIG. 7A is a schematic diagram of an LDM signal block of a transmission signal emitted by a primary TS with backhaul data for L1 layer services in one PLP of the L2 signal layer.
Figure 7B:
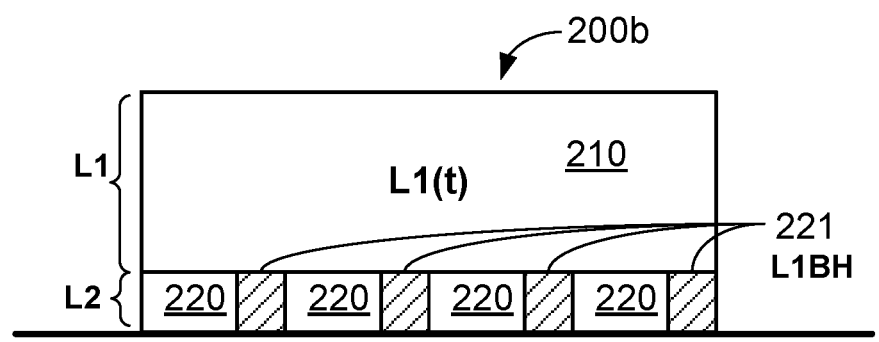
FIG. 7B is a schematic diagram of an LDM signal block of a transmission signal emitted by a primary TS with backhaul data for L1 layer services in multiple PLPs of the L2 signal layer.
Figure 7C:
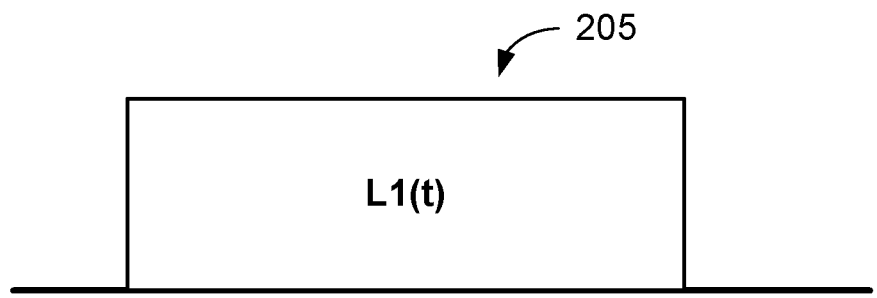
FIG. 7C is a schematic diagram of a signal block of a transmission signal emitted by the RTS with the L1 layer service signals generated from the in-band backhaul.

FIG. 7A schematically illustrates an example transmission signal block 200a of the Tx1 signal in which the L1BH 221 signal is transmitted in the L2 layer in a single sub-block, which may correspond for example to one physical layer pipe (PLP). FIG. 7B schematically illustrates an example transmission block 200b of the Tx1 signal 141 in which the L1BH signals 221 are carried in the L2 signal layer in multiple PLPs. The multi-PLP approach to transmitting backhaul data may offer more robust backhaul signal transmission due to better time-frequency diversity at the receiver. FIG. 7C illustrates a transmission block 205 of the Tx2 signal 142 that is generated by RTS 150 on the basis of the backhaul data "L1BH" received with the L1BH signal 121. The Tx2 signal 142 represented by the transmission block 205 may be viewed as a single-layer LDM signal that includes only L1 layer signals, with all LDM layers of lower power empty. An end-user 50 may process such a single-layer signal in a substantially same manner as the L1 layer signals of the Tx1 signal 141 having multiple LDM layers. The horizontal dimension of transmission signal blocks illustrated in FIGS. 7A-7C, and elsewhere in the present specification, represents time.

Figure 8:
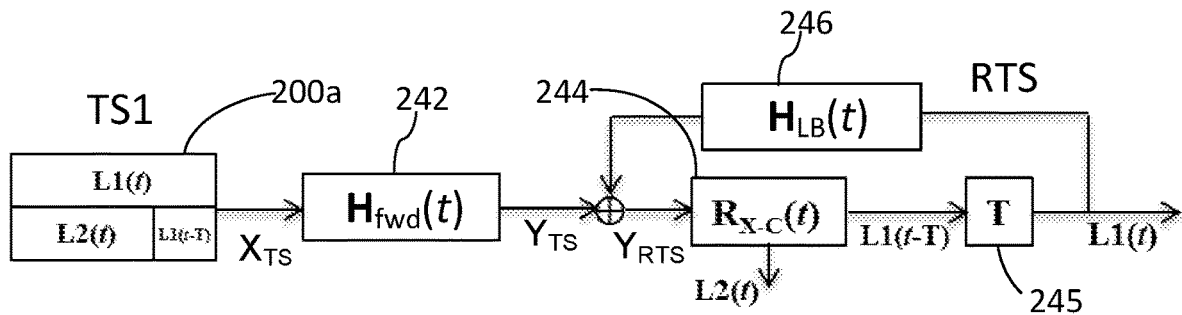
FIG. 8 is a schematic block diagram of signal transformation and processing from the emission by a primary TS to RTS transmission.

FIG. 8 schematically illustrates signal transformation and timing from the emission of the Tx1 signal by PTS 131 to the emission of the L2 service signal by RTS 150. The transmission signal block 200a transmitted by PTS 131 includes L1 service signals L1(t) in the L1 layer, and L2 service signals L2(t) in the L2 layer, both of which target end-users. The L2 layer also includes IBBH signals carrying the L1 service data to be re-transmitted by the RTS 150 as the L1 service signal. These IBBH signals are indicated as L1(t−T) as they are emitted ahead, by the lead time T, of the emission of the L1(t) service signal. Emitting the backhaul signals in advance of the corresponding service signals facilitates synchronizing the transmission of the common services from the RTS and the PTS. The backhaul signal denoted "L1(t−T)" may be transmitted in a single PLP or in multiple PLPs. The transformation of the Tx1 signal between the Tx antenna of PTS and the Rx antenna of RTS may be described by a forward channel 242 with a propagation function or operator $H_{fwd}(t)$ or $H_{fwd}$. A receiver function or operator 244 $R_{X-C}(t)$ describes signal equalization, decoding, L1 layer cancellation, backhaul extraction, and L1 signal re-encoding and re-modulation at the RTS. Delay 245 enables synchronizing the emission of the recovered L1(t) service signal by the RTS to the emission of the L1(t) service signal by the PTS. In the figure the delay 245 symbolically combines the time delays associated with the PTS-RTS signal propagation and the signal processing at the RTS. Thus the RTS transmits to the end-users the L1 service signal L1(t) that is time-synchronized with the transmission of the same L1(t) service signal by the PTS. The contribution of the Tx2 signal from the Tx antenna 155 into a wireless signal received by the Rx antenna 151 is indicated as the loopback (LB) channel 246 described by a LB channel function or operator $H_{LB}(t)$ or $H_{LB}$.

Figure 9:
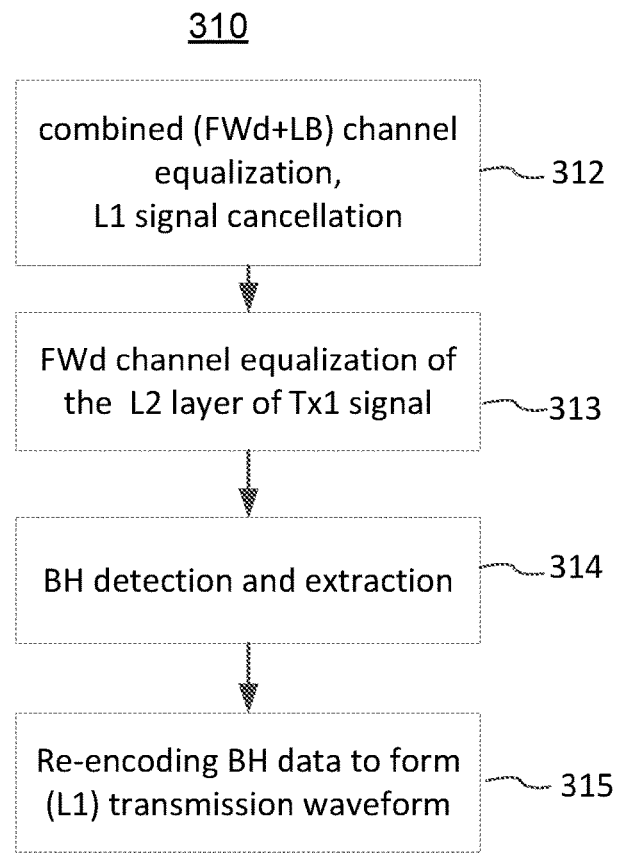
FIG. 9 is a flowchart of a method for in-band backhaul signal detection and processing at the RTS in the embodiment of FIGS. 7A-7C.

FIG. 9 illustrates a flowchart of method 310 that the BH processor 250 of RTS 150 may implement in embodiments where the PTS 131 transmits the L1 backhaul data "L1BH" in the L2 signal layer of the Tx1 signal 141 as illustrated in FIG. 7A or 7B, and the RTS transmits the L1 service signal L1(t) obtained from the extracted backhaul data "L1BH", and no L2 layer signals, as illustrated in FIG. 7C. Each block in the flowchart represents one or more steps or operations of method 310. In this embodiment the signal $Y_{RTS}$ provided to the BH processor 250 comprises L1 layer signals L1(t) received in the forward channel 242 and the loopback channel 246, and L2 layer signals received in the forward channel 242 only. To extract the backhaul data "L1BH", the BH processor 250 may be configured to cancel the L1 layer signals at block 312 to recover the L2 layer signal from PTS, and to extract the backhaul data "L1BH" therefrom at step 314.

In order to accurately detect and cancel the L1 layer signals, block 312 may include first performing channel estimation and equalization of the combined (FWd+BH) channel, which may be symbolically represented as $H_{comb}=(H_{fwd}(t)+H_{LB}(t))$. In some embodiments the L1 service signals L1(t) emitted by the PTS and RTS may include a same sequence of in-band pilot symbols. In such embodiments, pilot-assisted channel estimation (PACE) may be used for the combined (FWd+BH) channel estimation and equalization at block 312 to obtain an estimate $\hat{H}_{comb}=(\hat{H}_{fwd}+\hat{H}_{LB}(t))$ of the combined channel $H_{comb}$. The process of the L1 channel cancellation at block 312 may be symbolically represented as $$Y_{L2}=Y_{RTS}-X_{L1}\cdot(\hat{H}_{fwd}-\hat{H}_{LB})=X_{L2}\cdot g\cdot H_{fwd}(N_{RTS}+I_{L1}) \quad (4)$$

where $Y_{L2}$ denotes symbol decisions on the L2 layer signal after the cancellation of the L1 layer signal L1(t), $X_{L1}$ denotes symbols of the L1 layer service signal L1(t), $X_{L2}$ denotes symbols of the L2 layer service signal L2(t), ($\hat{H}_{fwd}$(t)+$\hat{H}_{LB}$(t)) is an estimate of the combined response of the forward channel and the loopback channel, $N_{RTS}$ is the noise added by the RTS, $I_{L1}$ is the residual L1 layer noise after the L1 layer cancellation, and g is an injection level of the L2 layer signals relative to the L1 layer signals in the forward signal X(t) generated by the PTS.

In some embodiments, for example when the loopback signal $Y_{LB}$ from the Tx antenna 155 is significant, in order to detect and accurately decode, at step or operation 314, the L1 backhaul data "L1BH" received from the PTS, at block 313 the BH processor 250 may perform channel estimation and equalization for the forward channel $H_{fwd}$ 242; this operation may be performed after the combined L1 layer signals are cancelled. Once a forward channel estimate $\hat{H}_{fwd}$ is obtained, the forward channel equalization at block 313 may be performed to obtain decision estimates $\hat{X}_{L2}$ on the L2 layer signals:

$$\hat{X}_{L2} = \frac{Y_{L2}}{g\hat{H}_{fwd}} = X_{L2}\cdot \frac{H_{fwd}}{\hat{H}_{fwd}} + \frac{N_{RST}+I_{L1}}{g\hat{H}_{fwd}} \quad (5)$$

The channel estimation of the forward channel 242 using in-band pilots may be hindered when there is a significant loopback signal power. One solution to estimate the forward channel 242 $H_{fwd}$ is to make use of a unique signature signal that may be present in the Tx1 signal 141 from PTS 131 and absent in the Tx2 signal from the RTS. Communication standards such as ATCS 3.0 specify a transmitter identification (TxID) sequence or signal that may be added to a transmission frame and that is unique to the transmitter in a given network. Accordingly in some embodiments PTS 131 may be configured to add a TxID sequence to the Tx1 signal it emits, and the BH processor 250 of RTS 150 may be configured to perform TxID-based forward channel estimation and equalization at block 313 prior to the backhaul signal detection and extraction at block 314.

Figure 10:
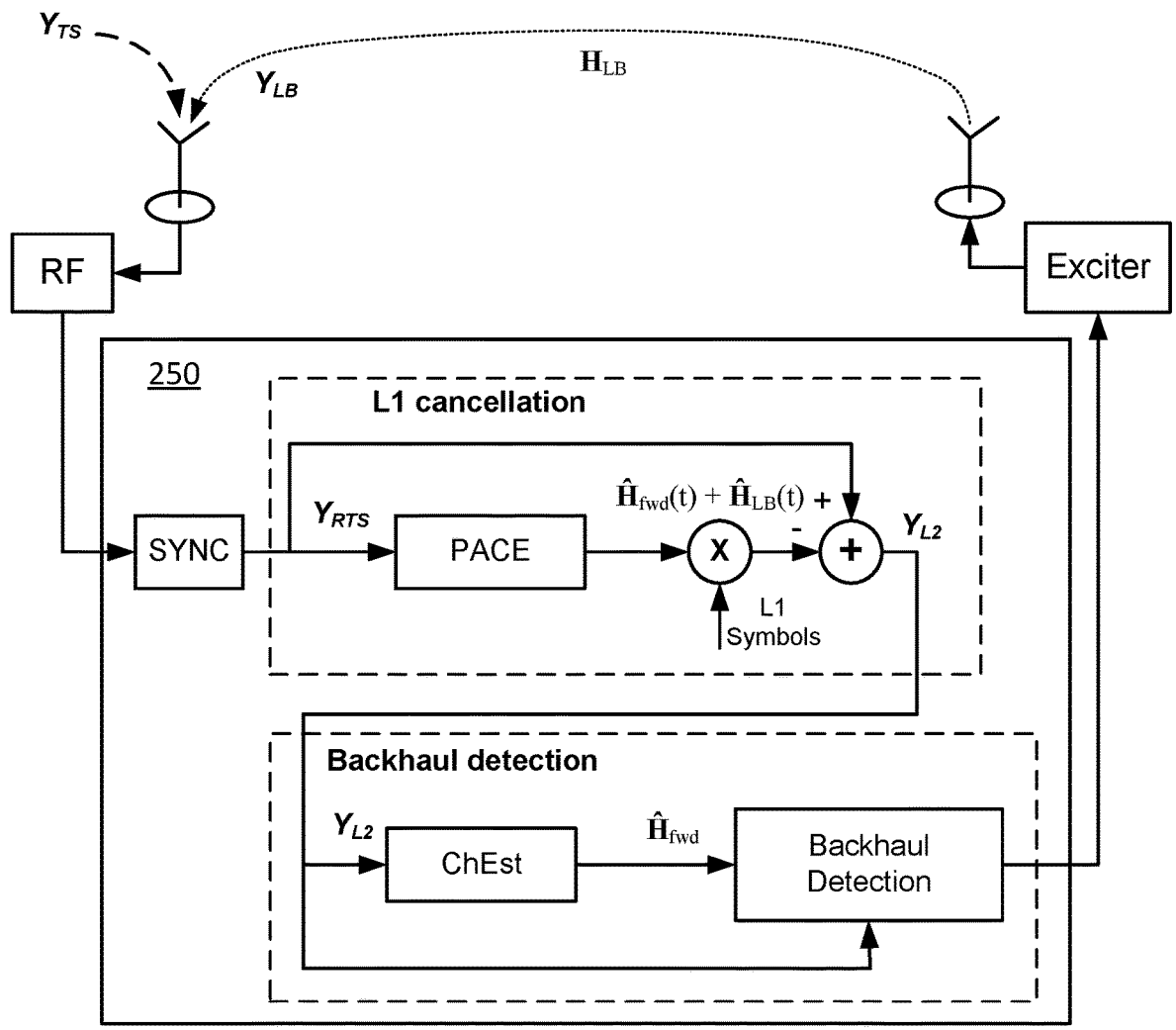
FIG. 10 is a schematic functional block diagram of an RTS configured to process the transmission signal with in-band backhaul in the embodiment of FIGS. 7A-7C.

FIG. 10 schematically illustrates the process of detecting L1BH signal in the L2 layer of the Tx1 signal by the BH processor 250 in accordance with an embodiment of method 310 of FIG. 9. $Y_{RTS}$ represents the relay signal received by the CEE module 253, while $Y_{L2}$ represents the L2 signal after block 312 of method 310. Block "PACE" represents pilot-assisted channel estimation for the combined (FWd+LB) channel $H_{comb}$ that provides the combined channel estimate $\hat{H}_{comb}$(t)=($\hat{H}_{fwd}$+$\hat{H}_{LB}$(t)), which enables equalizing the received signal $Y_{RTS}$, and detecting and canceling the L1 service signal 210 from the equalized received signal $Y_{RTS}$. Block "ChEst" represents the forward channel estimation that provides the estimate $H_{fwd}$(t) of the forward channel $H_{fwd}$(t). In some embodiments block "ChEst" may use a TxID sequence in the Tx1 signal 141, such as the TxID 353 defined in ATSC 3.0 and illustrated in FIG. 11, or another suitable transmitter signature sequence that may be added by the PTS 131 to the Tx1 signal 141.

Figure 11:
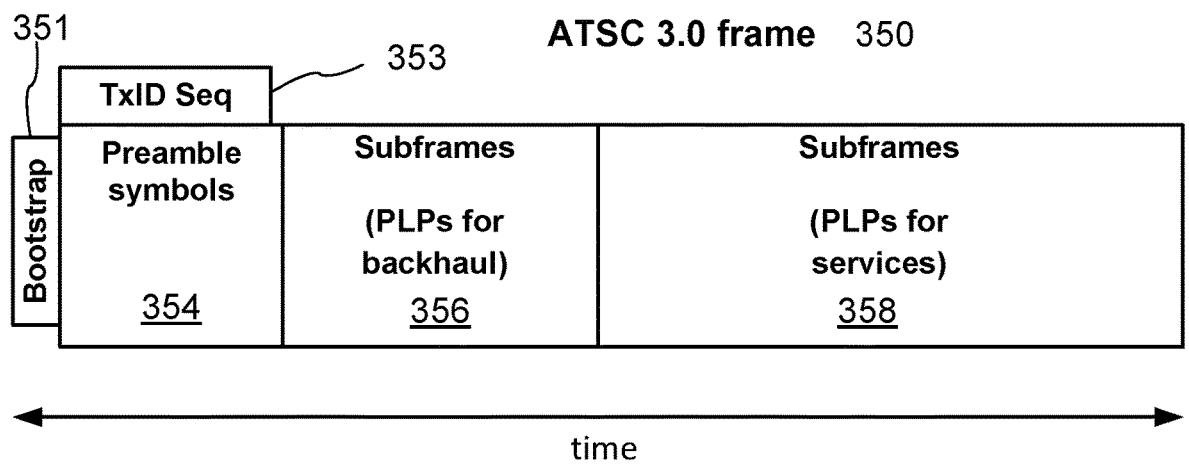
FIG. 11 is a schematic diagram of an ATSC 3.0 signal frame showing a TxID sequence.

With reference to FIG. 11, in embodiments operating in accordance with the ATSC 3.0 standards, a transmission frame 350 of the Tx1 signal may include a bootstrap 351, a preamble 354, and one or more subframes 356, 358 concatenated in time. The subframes may include one or more subframes 356 carrying backhaul data and possibly also service data, which may be followed by one or more subframes 358 carrying service data. Each of these components of the frame 350 may be composed of a sequence of OFDM symbols. In some embodiments frame 350 may be setup to carry a variety of PLPs, each of which may be using their own modulation types, FFT sizes, error correction coding, etc, which may allow multiple services of possibly different Quality of Service (QoS) in a single RF transmission. Bootstrap 351 is configured to be robust for reception to facilitate the detection of the wireless signal by receivers; it contains data assisting in timing synchronization and demodulating the preamble 354. The preamble 354 may immediately follow the bootstrap 351 and is configured to assist receivers in demodulation and decoding the rest of the frame. In some embodiments described herein the preamble 354 may be used in the combined forward and loopback channel estimation as described hereinabove. Each of the subframes 356, 358 may contain a single LDM layer L1, or two or more LDM layers such as, but not limited to, the signal layers L1 and L2 described above. In some embodiments the backhaul-carrying subframe or subframes 356 may include backhaul data in one or more PLPs of the L2 layer and service data in one or more PLPs of the L1 layer.

In some embodiments a transmitter may insert a unique low-power transmitter identification (TxID) signal 353 at the beginning of each transmission frame 350. In embodiments following the ATSC 3.0 standards, the TxID signal 353 may be a binary phase shift keying (BPSK) sequence generated from a Golden sequence, which may be superimposed over the preamble 354 at a lower power level than the preamble symbols. The TxID signal 353 may be used for both synchronization and channel estimation purposes. A TxID signal 353 inserted by the PTS 131 in the Tx1 signal 141 may be used to achieve an accurate estimate of the forward channel from the PTS to the RTS 150. A TxID signal 353 inserted by the RTS 150 in the Tx2 signal 142 may be used to achieve an accurate estimate of the loopback channel from the Tx antenna 155 to the Rx antenna 151 of the RTS. As a TxID based channel estimation provides a channel estimate at the TxID transmission time, having the backhaul PLP(s) positioned at the beginning of each frame, and thus next to the TxID time slot as shown in FIG. 10, may facilitate accurate channel estimation for the IBBH signal recovery.

Figure 12A:
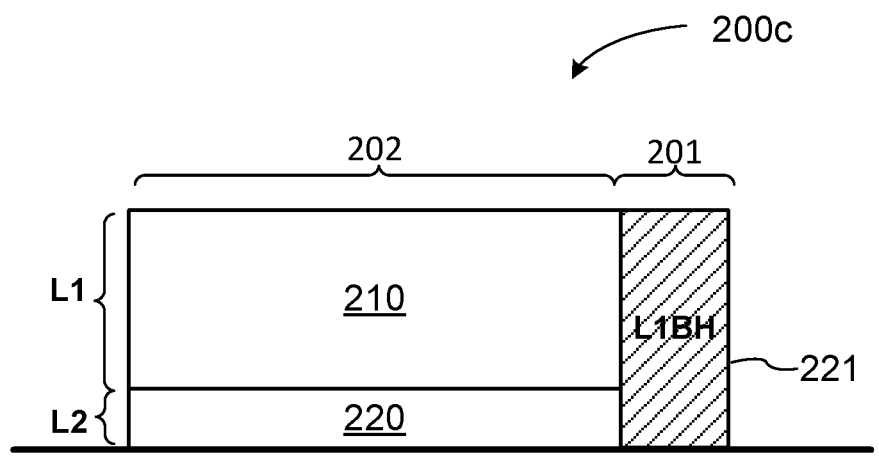
FIG. 12A is a schematic diagram of an LDM signal block with in-band backhaul data for L1 layer services in a different time slot from L1 and L2 service signals.

FIGS. 12A-14 relate to an embodiment wherein PTS 131 transmits backhaul data "L1BH" for L1 services in a different time slot than the L1 and L2 service signals, so that the backhaul signals and the service signals are multiplexed using time-domain multiplexing (TDM). FIG. 12A schematically illustrates an example transmission signal block 200c of the Tx1 signal in which the L1BH signal 221 is transmitted in a first timeslot 201, and the L1 and L2 service signals 210, 220 are transmitted in a second time slot 202 that follows in time the first timeslot 201. The first timeslot 201, which is absent of the L1 service signals 210, may also be referred to herein as the backhaul timeslot. FIG. 12B illustrates a transmission block 200d of the Tx2 signal 142 that may be generated by RTS 150 on the basis of the backhaul data "L1BH" obtained from the L1BH signal 121 according to an embodiment. The Tx2 signal 142 represented by the transmission block 200d may be viewed as a single-layer LDM signal that includes only L1 layer signals, with all LDM layers of lower power empty. The L1BH signal 221 may be transmitted with the lead time T ahead of the L1 service signal 210, the lead time T being at least equal to a time delay associated with the transmission and processing of the backhaul data from the PTS 131 to the RTS 150, so as to synchronize the reception of the corresponding L1 signals from PTS and RTS by the end-users 50.

In some embodiments the transmission block 200d of the Tx2 signal may include a training signal portion in a timeslot 203 and a service signal portion in a timeslot 204. The training signal portion in the timeslot 203 contains a pre-defined training sequence 231 that may be unique to the RTS. The service signal portion in the timeslot 204 may be formed of, or include, L1 layer signals generated from the backhaul data "L1BH". In the illustrated embodiments the training sequence timeslot 203 and the service signal timeslot 204 are concatenated in time. In some embodiments the transmission block 200d generated by the RTS may have substantially the same structure in time as the transmission block 200c of the Tx1 signal, with the training sequence 231 replacing the backhaul data "L1BH" in the backhaul timeslot 201. The training sequence 231 may be for example a pseudo-random (PRN) data sequence that is unique to the RTS. In other embodiments the training sequence 231 may be in the form of a TxID as described with reference to FIG. 11 and FIG. 30.

Similarly to the embodiments described above, the L1 service signals 210 may correspond for example to mobile-broadcast services (MBS) that require more robust signal delivery and thus are transmitted in the higher-power L1 layer, while the L2 service signals 220 may correspond to fixed-broadcast services (FBS) targeting end-users with higher-power fixed antennas, such as DTV. Thus RTS 150 in this embodiment may be providing MBS for mobile customers in a remote area that is absent of fixed DTV antennas, and may be transmitting the Tx2 signal 142 with the MBS in the L1 signal layer and an empty L2 layer, or effectively as a single-layer transmission signal.

Figure 13:
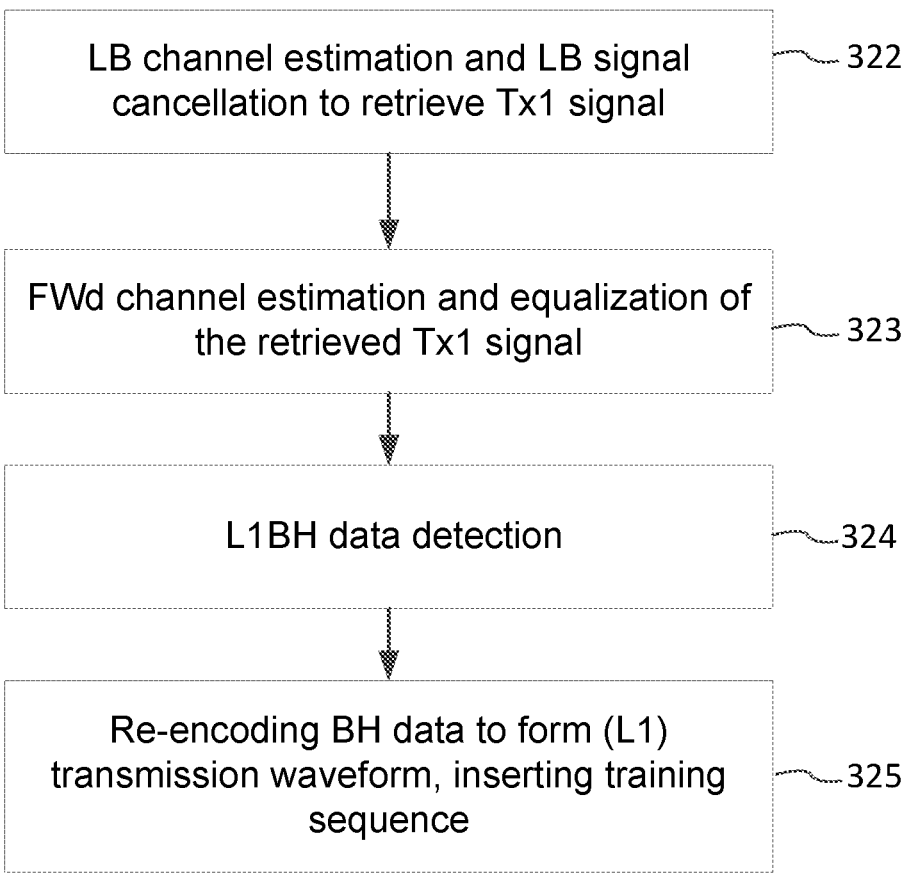
FIG. 13 is a flowchart of a method for in-band backhaul signal detection and processing at the RTS in the embodiment of FIGS. 12A, 12B.

FIG. 13 illustrates a flowchart of method 320 that the BH processor 250 of RTS 150 may implement in embodiments where PTS 131 transmits the L1BH signal 221 in the backhaul timeslot 201 that is absent of the L1 service signals, as illustrated in FIG. 12A. Each block in the flowchart represents one or more steps or operations of method 320, and may be referred to herein as "step". In this embodiment, the L1BH signal 221 may be recovered by first cancelling the loopback signal at block 322, and then performing forward channel estimation and equalization at block 323 to recover the Tx1 signal 141 having the L1BH signal 221 in the backhaul timeslot 201. Once the L1BH signals 221 are detected and the backhaul data "L1BH" extracted at block 324, the Tx signal encoding module 257 of the RTS may re-encode the L1 service data extracted from the L1BH signal 221 to form a Tx2 transmission waveform. In some embodiments step 325 may include inserting the pre-defined training sequence 231 that is known to the BH processor 250, for example in place of the L1BH signal 221 to form transmission blocks 200d. Step 322 may include detecting the training sequence 231 in the received signal $Y_{RTS}$, and using the detected training sequence to estimate the loopback channel $H_{LB}(t)$. The estimation of the forward channel $H_{fwd}(t)$ at step 323 may be carried out using pilot signals generated by the PTS 131. Note that cancelling the loopback signal at 322 also cancels the pilot symbols in the loopback signal $Y_{LB}$, so that the PACE performed at step 323 estimates the forward channel separately from the loopback channel.

In some embodiments the signal $Y_{RTS}$ received by the RTS 150 in the BH timeslot 201 may be symbolically described as $$Y_{RTS}=X_{TS}*H_{fwd}+X_{Tr}*H_{LB}+N_0=Y_{TS}+Y_{LB}+N_0 \tag{6}$$

where $X_{Tr}$ denotes the training sequence 231 transmitted by the RTS in the backhaul timeslot 201. The LB signal cancellation may be described as $$\hat{Y}_{TS}=Y_{RTS}-X_{Tr}*\hat{H}_{LB}=X_{TS} \cdot H_{fwd}+X_{Tr} \cdot (H_{LB}-\hat{H}_{LB})+N_0 \tag{7}$$

Figure 14:
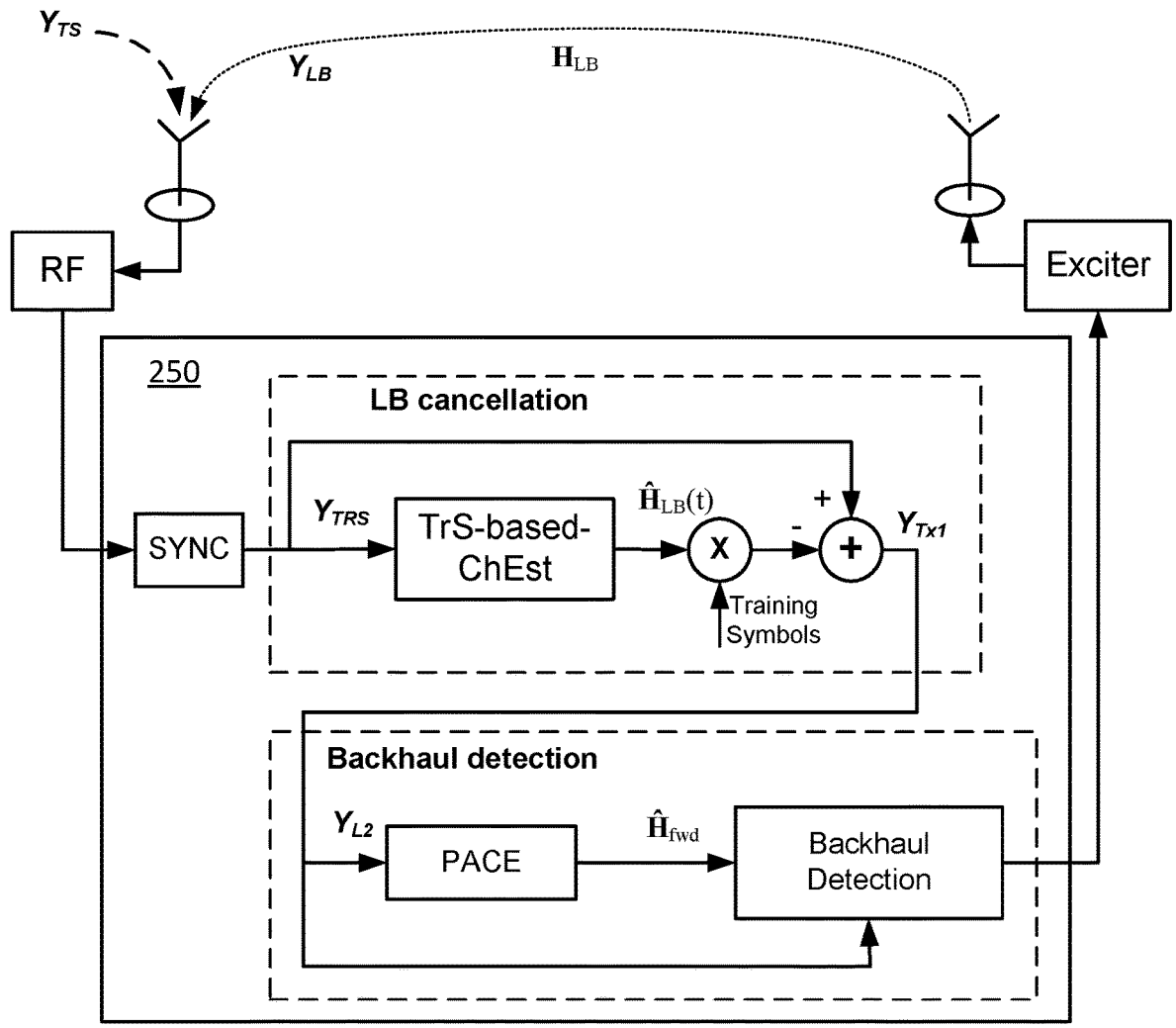
FIG. 14 is a schematic functional block diagram of an RTS configured to process the transmission signal with in-band backhaul in the embodiment of FIGS. 12A-12B.

FIG. 14 schematically illustrates the process to detect TDM backhaul in the Tx1 signal by the BH processor 250 in accordance with an embodiment of method 320 of FIG. 13. Here $Y_{RTS}$ represents the signal received by the CEE module 253, $Y_{Tx1}$ represents the recovered Tx1 signal after performing operations at step 322 of method 320, block "TrS-based ChEst" represents the loopback channel estimation that uses the training signal inserted in the Tx2 signal at step 325. Block "PACE" represents pilot-assisted channel estimation for the forward channel that provides an estimate of $\hat{H}_{fwd}(t)$, which enables to equalize the recovered Tx1 signal $Y_{Tx1}$ enabling the backhaul detection. In some embodiments block "TrS-based ChEst" may use a TxID sequence in the Tx2 signal 142, such as the TxID 353 defined in ATSC 3.0 and illustrated in FIG. 11, or another suitable transmitter signature sequence that may be added by the RTS 150 to the Tx2 signal 142.

With reference to FIGS. 15A-17, in some embodiments the IBBH signals 172 may be represented by backhaul signals 222 carrying backhaul data "(L1+L2)BH" for both the L1 and L2 service signals 210, 220. In such embodiments RTS 150 may re-generate both the L1 service signals 210 and the L2 service signals 220 from the received backhaul data "(L1+L2)BH", and transmit them in the L1 and L2 signal layers of the Tx2 signal 142, respectively.

Figure 15A:
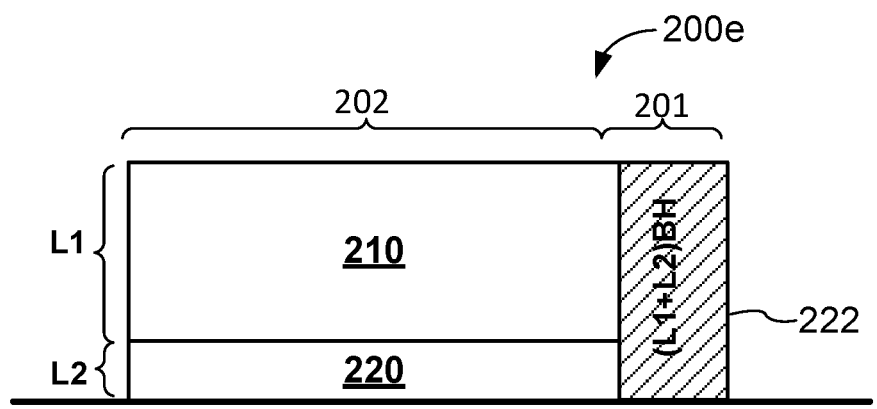
FIG. 15A is a schematic diagram of an LDM signal block with in-band backhaul data for L1 and L2 layer services in a different time slot from L1 and L2 service signals.

FIG. 15A relates to an embodiment wherein the Tx1 signal 141 is composed of transmission blocks 200e in which the backhaul signals 222 are transmitted, using time division multiplexing (TDM), in a backhaul timeslot 201 that is absent of the L1, L2 service signals 210, 220 directed to end-users. To detect this backhaul signal, RTS 150 may implement an embodiment of method 320 of FIG. 13 in which step 324 includes separately extracting L1 service data and L2 service data from the detected backhaul signal 222, and step 352 includes encoding the L1 service data extracted from the backhaul signal for transmitting with the L1 layer of the Tx2 signal, encoding the L2 service data extracted from the backhaul signal for transmitting with the L2 layer of the Tx2 signal, and forming the Tx2 transmission waveform composed of the L1 and L2 layer signals. This step may also include inserting the training sequence in the Tx2 signal as described above, for example in place of the backhaul signal in the Tx1 transmission block 200e, which may result in a transmission block 200f of the Tx2 signal shown in FIG. 15B.

Figure 15B:
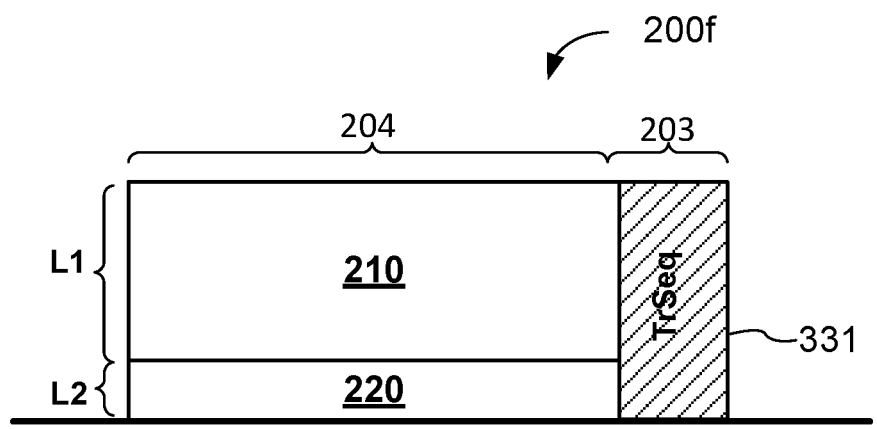
FIG. 15B is a schematic diagram of a signal block of an RTS re-transmitted signal with a training sequence replacing the backhaul data of the signal of FIG. 15A in its time slot.
Figure 15C:
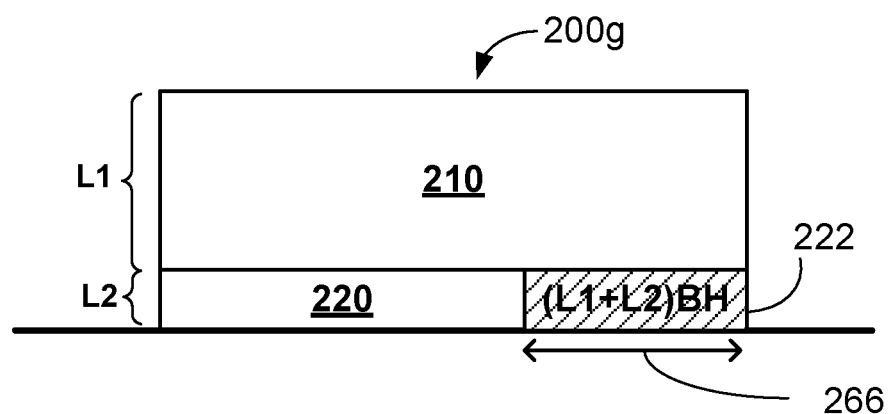
FIG. 15C is a schematic diagram of an LDM signal block with in-band backhaul data for L1 and L2 layer services in the L2 signal layer.

FIG. 15C relates to embodiments wherein the Tx1 signal 141 generated by PTS 131 is composed of transmission blocks 200g in which the backhaul signal 222 carrying the backhaul data "(L1+L2)BH" for the L1 and L2 service signals are transmitted within the L2 signal layer in a backhaul timeslot 266, and RTS 150 re-transmits the L1 and L2 service signals extracted from the backhaul signals 222 in respective signal layers.

Figure 15D:
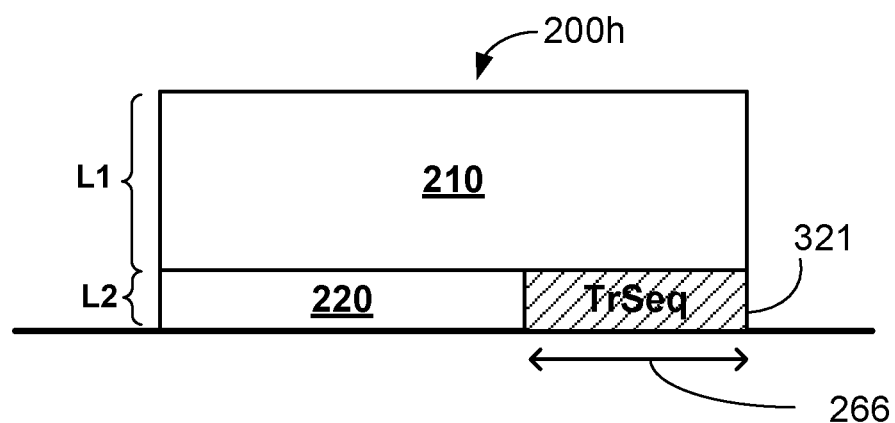
FIG. 15D is a schematic diagram of a signal block of an RTS re-transmitted signal with a training sequence replacing the in-band backhaul data of the signal of FIG. 15C in the L2 layer.
Figure 16:
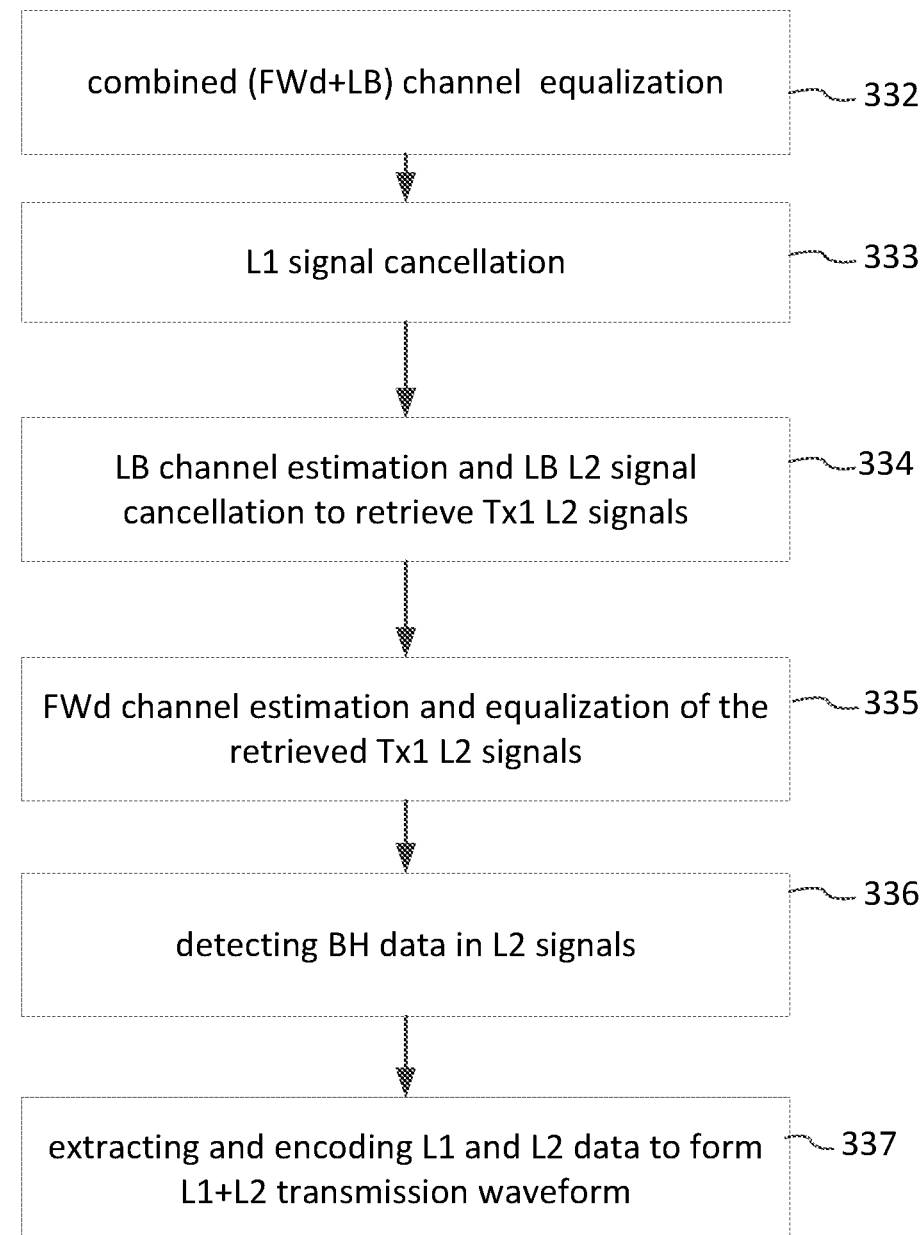
FIG. 16 is a flowchart of a method for in-band backhaul signal detection and processing at the RTS in the embodiment of FIGS. 15C, 15D.
Figure 17:
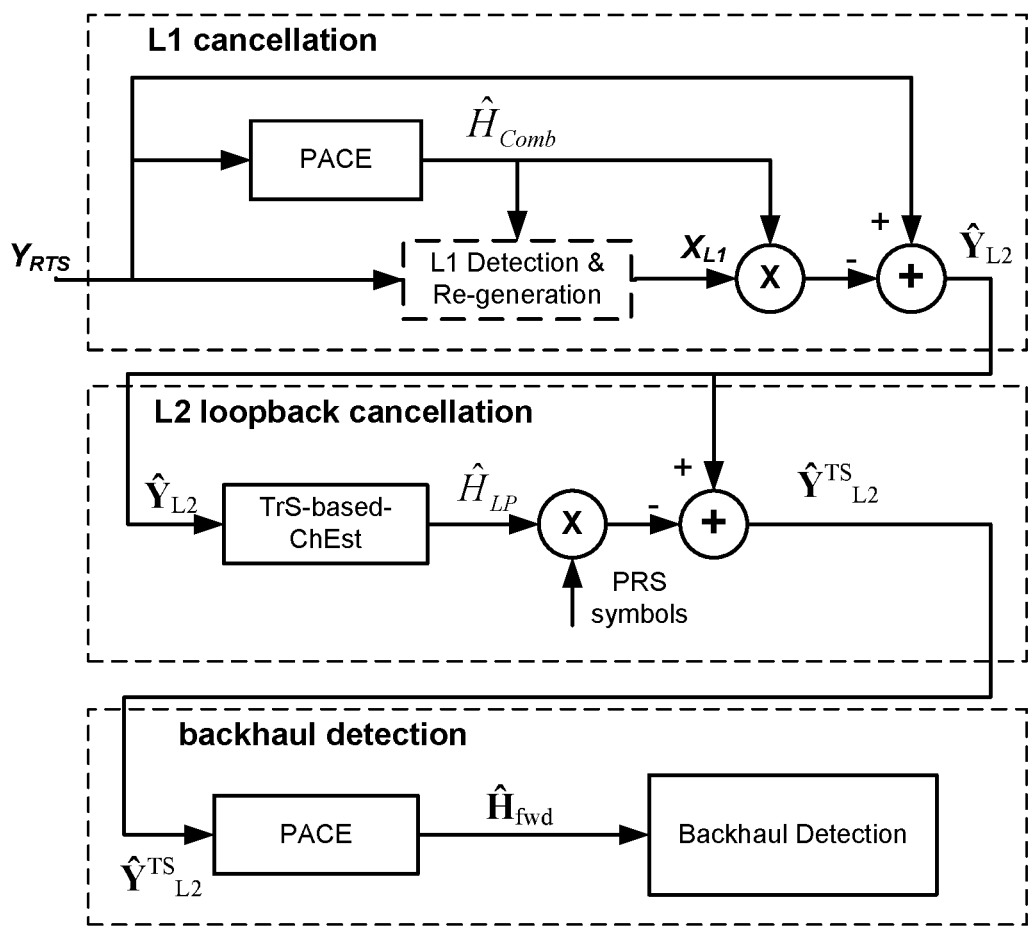
FIG. 17 is a schematic functional block diagram of a backhaul processor of an RTS configured to process the transmission signal with in-band backhaul in the embodiment of FIGS. 15C-15D.

FIG. 16 is a flowchart of method 330 that RTS 150 may implement to extract the backhaul signals 222 from the received relay signal $Y_{RTS}$ and to generate the Tx2 signal 142 with the two LDM layers L1 and L2 carrying the L1 service signals 210 and the L2 service signals 220. Each block in the flowchart represents one or more steps or operations of method 330, and may be referred to herein as "step". FIG. 17 schematically illustrates a process to detect the backhaul signal 222 in the relay signal $Y_{RTS}$ received by the BH processor 250 in accordance with an embodiment of method 330 of FIG. 16. The Tx2 signal 142 generated by RTS 150 from the received backhaul data "(L1+L2)BH" may be in the form of a sequence of transmission blocks 200h illustrated in FIG. 15D, with a training sequence 321 in the backhaul time slot 266 to assist in a loopback signal cancellation.

Referring to FIGS. 16 and 17, in the illustrated embodiment the processing takes into account that the backhaul signals 222 are buried in the L2 layer of the received signal $Y_{RTS}$, and therefore the L1 layer signals have to be cancelled at step 333 to recover the backhaul 222. Furthermore, since L1 signals 210 are received by the RTS in both the forward and the loopback channels, a combined (FWd+LB) channel estimation may be first performed at step 332 to detect the L1 signals 210. The cancellation of the L1 signals 210 leaves a first remainder signal $\hat{Y}_{L2}$ with contributions from the L2 layer signals. Since in this embodiment the L2 layer signals are also received by the RTS in both the forward and the loopback channels while the backhaul data are received in the forward channel only, the loopback channel estimation and the cancellation of the L2 loopback signal from the $\hat{Y}_{L2}$ signal is performed at step 334 to obtain an estimate $\hat{Y}_{TS}^{L2}$ of the PTS-transmitted L2 layer signals $Y_{TS}^{L2}$ as received by the RTS. The estimate $\hat{Y}_{TS}^{L2}$ of the PTS-transmitted L2 layer signals may also be referred to herein as the second remainder signal or as the retrieved PTS L2 layer signal. At step 335 a forward channel estimation and equalization may be carried out on the second remainder signal $\hat{Y}_{TS}^{L2}$, which enables the detection of the backhaul signals 222 carrying the backhaul data "(L1+L2)BH" at step 336. Step 336 may also include separately extracting L1 service data and L2 service data from the detected backhaul data "(L1+L2)BH". Step 337 may include encoding the L1 service data extracted from the backhaul signals 222 for transmitting with the L1 layer of the Tx2 signal, encoding the L2 service data extracted from the backhaul signals 222 for transmitting with the L2 layer of the Tx2 signal, and forming the Tx2 transmission waveform composed of the L1 and L2 layer signals. This step may also include inserting the training sequence 321 in the Tx2 signal as described above, for example in place of the backhaul data 222 in a Tx1 transmission block 200g, which may result in a transmission block 200h of the Tx2 signal shown in FIG. 15D.

In some embodiments the signal $Y_{RTS}$ received at the RTS 150 in the BH timeslot 266 may be symbolically described as $$Y_{RTS}=X_{L1}(H_{fwd}+H_{LB})X_{TS}^{L2} \cdot H_{fwd}+X_{Tr} \cdot H_{LB}+N_0 \quad (8)$$

where $X_{Tr}$ represents the training sequence 321 transmitted by the RTS 150 in the backhaul timeslot 266, and $X_{TS}^{L2}$ represents the L2 signals transmitted by the PTS 131 in the backhaul timeslot 266, i.e. the IBBH signal 222. The L1 signal layer cancellation may be described as $$\hat{Y}_{L2}=Y_{RTS}-X_{L1}*\hat{H}_{comb}=X_{TS}^{L2} \cdot H_{fwd}+X_{Tr} \cdot H_{LB}+X_{L1} \cdot (H_{comb}-\hat{H}_{comb})+N_0 \quad (9)$$

where $\hat{H}_{comb}=(\hat{H}_{fwd}+\hat{H}_{LB})$ is an estimate of the combined channel response $H_{comb}=(H_{fwd}+H_{LB})$, and $\hat{Y}_{L2}$ is the first remainder signal that remains from the received signal $Y_{RTS}$ after the cancellation of the L1 signal layer. The cancellation of the contribution of the loopback signal into the first remainder signal $\hat{Y}_{L2}$ may be described as $$\hat{Y}_{TS}^{L2}=\hat{Y}_{L2}-X_{Tr}*\hat{H}_{LB}=X_{TS}^{L2} \cdot H_{fwd}X_{Tr} \cdot (H_{LB}-\hat{H}_{LB})+X_{L1} \cdot (H_{comb}-\hat{H}_{comb})+N_0 \quad (10)$$

where $\hat{Y}_{L2}$ is a second remainder signal that remains from the received signal $Y_{RTS}$ after the cancellation of the L2 signal layer of the loopback signal. With an obtained forward channel estimate $\hat{H}_{fwd}$, a forward channel equalization may be performed to decode the L2 backhaul signal 222:

$$\hat{X}_{TS}^{L2} \cong \hat{Y}_{TS}^{L2}/H_{fwd} \quad (11)$$

FIG. 17 schematically illustrates the process of detecting backhaul signals in the L2 signal layer of the Tx1 signal by an RTS in accordance with an embodiment of method 330 of FIG. 16. Here $Y_{RTS}$ represents the received signal after timing synchronization, $X_{L1}$ represents the L1 signal detected in step 332 of method 330, and blocks "PACE" represent pilot-based channel estimators. Block "TrS-based ChEst" may represent the loopback channel estimator that uses the training signal (TrS) inserted in the L2 layer of the Tx2 signal at step 337. In another embodiment the RTS may be configured to insert a TxID sequence in the Tx2 signal, for example as defined in the ATSC 3.0 standards, and block "TrS-based ChEst" may represent a TxID based channel estimator that uses this TxID sequence for the loopback channel estimation. Block "PACE" in the "L1 cancellation" module provides pilot-assisted channel estimation $\hat{H}_{comb}=(\hat{H}_{fwd}+\hat{H}_{LB})$ for the combined "forward+loopback" channel. Block "PACE" in the "backhaul detection" module provides pilot-assisted channel estimation $H_{fwd}$ for the forward channel.

In embodiments wherein the Tx1 signal emitted by the PTS, such as the Tx1 signal 141 emitted by PTS 131 of MCS 100, is used to deliver backhaul data for both the higher-capacity L2 layer service signals, such as the EL signals carrying fixed base services in an ATSC 3.0 SFN, the backhaul transmission may be competing with the fixed service for the radio resource in the L2 layer. One approach to increase the transmission capacity of the Tx1 signal carrying the backhaul is to use a multiple-antenna technology such as MIMO (multi-input multi-output), in which multiple antennas are used at both the primary transmitter and the RTS receiver. By way of example, backhaul transmission using 2×2 MIMO communications between a PTS and an RTS can almost double the backhaul transmission capacity within the same time-frequency resource dedicated to the backhaul. Embodiments using N×N MIMO with N>2 for the in-band backhaul transmission may provide a further increase in the backhaul transmission capacity of the Tx1 signal.

Figure 18A:
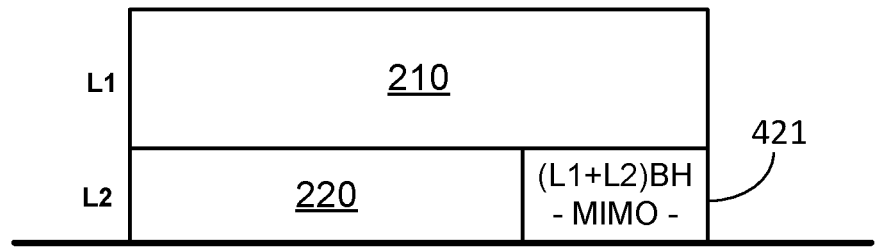
FIG. 18A is a schematic diagram of an LDM signal block with MIMO-configured in-band backhaul data for L1 and L2 layer services in the L2 signal layer.
Figure 18B:
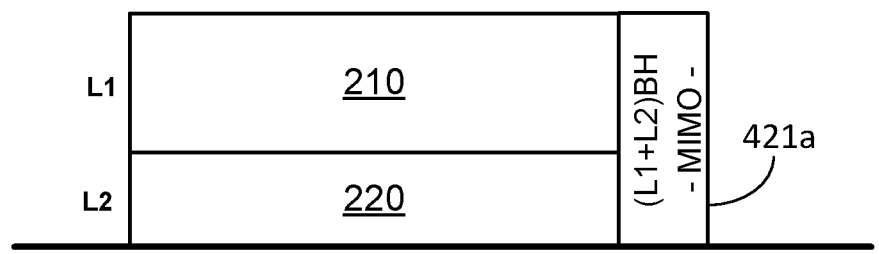
FIG. 18B is a schematic diagram of an LDM signal block with L1 and L2 layer services, and the MIMO-configured in-band backhaul data therefor in different time blocks.

In some embodiments different antenna technologies may be applied in different LDM layers of a Tx1 signal carrying the backhaul and/or in different transmission resource blocks (time or frequency). FIG. 18A illustrates an example transmission signal block in an embodiment wherein a MIMO signal format is used in a L2 level transmission block 421 carrying backhaul data "(L1+L2)BH", while the L1 and L2 layer PLPs carrying the L1 and L2 service signals 210 and 220 use SISO (single input single output) signal format directed to transmitters and receivers with single antennas. FIG. 18B illustrates an example transmission signal block in an embodiment wherein the L1 and L2 layer service signals 210, 220, and the MIMO backhaul signals 421a therefore are transmitted in different time slots. Multi-element antennas capable of supporting MIMO communications may be used both at the primary TS such as PTS 131 and an RTS such as RTS 150. End-user receivers lacking MIMO support may ignore the MIMO transmission block or PLP 421 carrying the backhaul data. The use of MIMO format can significantly reduce the transmission resource used by the backhaul data.

Although the current ATSC 3.0 standard may not allow different MIMO/SISO configurations in different LDM layers, some embodiments may use separate ATSC 3.0 frames for backhaul data that use MIMO and are time-multiplexed with standard ATSC 3.0 frames carrying services. In some embodiments a future extension frame (FEF) defined in ATSC 3.0 may be employed to deliver backhaul using MIMO. A FEF is a special frame that may be ignored by conventional ATSC 3.0 receivers but would be decoded by devices other than conventional ATSC 3.0 receivers. FEFs are designed to insert signals from other wireless systems so they can share the TV broadcasting spectrum.

Figure 19:
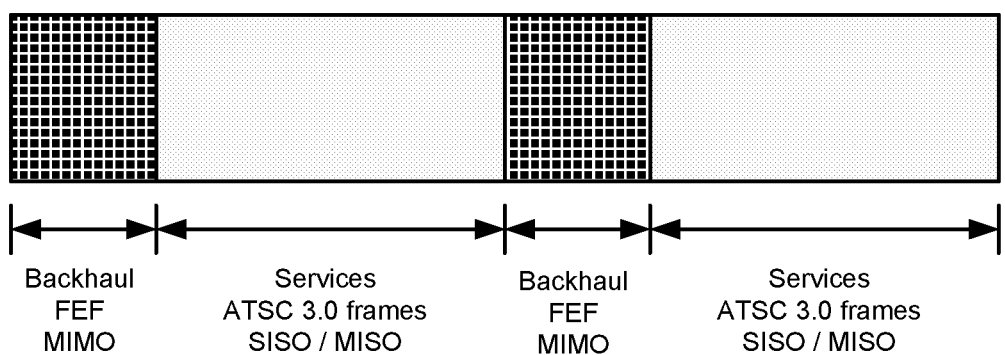
FIG. 19 is a schematic diagram of a transmission signals sequence with MIMO-configured frames carrying in-band backhaul time multiplexed with SISO/MISO frames carrying service signals.

Referring to FIG. 19, embodiments of the present disclosure may utilize FEFs to carry in-band backhaul signals using MIMO in an ATSC 3.0 SFN. When using standard ATSC 3.0 waveforms for backhaul transmission in a FEF, the FEF may use a more efficient transmission mode than other frames of the signal, e.g. with less in-band pilots and shorter CPs (cyclic prefix). The transmission waveform in FEF may differ from a conventional ATSC 3.0 waveform, and signal modifications can be made in order to achieve more efficient backhaul signal delivery. Examples may include using orthogonal pilot patterns in the FEF backhaul signal waveform and the loopback signal waveform, such as those defined for 2×2 MIMO transmission in ATSC 3.0, LTE, or other communication systems. This may allow more accurate channel estimation for loopback signal cancelation. Furthermore, in some embodiments the loopback signal during the FEF period emitted from the Relay Transmitter Station may be partially or completely nulled (zero-signal power) so as to make the loopback signal cancellation unnecessary. Service signals may be transmitted in conventional ATSC 3.0 frames with LDM that are time-multiplexed with the FEF MIMO frames, as illustrated in FIG. 19. The FEF MIMO frames may be single-layer or multi-layer LDM frames.

Figure 20A:
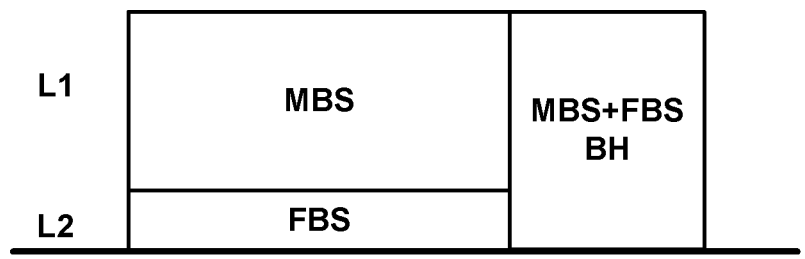
FIG. 20A is a schematic diagram of an LDM signal block with time-multiplexed in-band backhaul data for MBS and FBS in a same PLP.
Figure 20B:
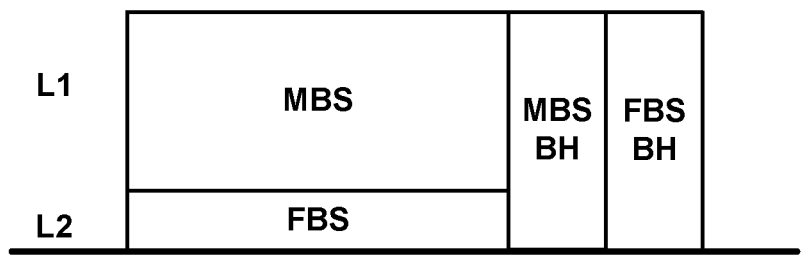
FIG. 20B is a schematic diagram of an LDM signal block with time-multiplexed in-band backhaul data for MBS and FBS in different PLPs.
Figure 20C:
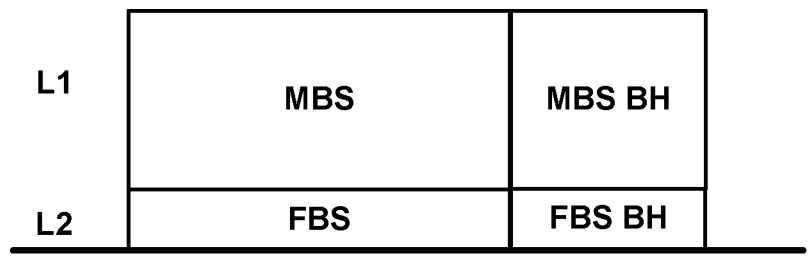
FIG. 20C is a schematic diagram of an LDM signal block with a time-multiplexed in-band backhaul portion carrying MBS and FBS in different LDM layers.

In-band transmission of backhaul data in a dedicated time slot of a transmission signal, such as described above with reference to FIGS. 12A-15B, enables using full RF transmission power for the backhaul delivery, which may facilitate backhaul signal detection at remote RTS locations and in the presence of significant interference from the loopback signal. In various embodiments the time multiplexing of the backhaul signals with the service signals may be accomplished in different forms, such as illustrated in FIGS. 20A-20C by way of example. In each of these configurations, the transmission signal delivers services and backhaul for these services in different time slots, with the services comprising MBS transmitted by L1 layer signals and FBS transmitted by L2 layer signals. The transmission signals of each of these configurations may be processed at an RTS generally as described above with reference to FIGS. 12A-15B.

FIG. 20A illustrates a transmission signal configuration in which a single-layer PLP is used to deliver the backhaul signal of both L1 services (MBS in this example) and L2 services (FBS in this example). The MBS backhaul signals (MBS-BH) and FBS backhaul signals (FBS-BH) in this embodiment use the same coding and modulation modes.

FIG. 20B illustrates a transmission signal configuration in which two time-domain single-layer PLPs are used to deliver the backhaul signal of the L1 and L2 services. The MBS-BH and FBS-BH can now be delivered using different coding and modulation. The MBS-BH may use a more robust transmission mode so when the FBS-BH detection fails, an RTS receiving these signals may still deliver a robust mobile service (MBS) in the L1 layer to end-users in its coverage area.

FIG. 20C illustrates a transmission signal configuration which is a two-layer LDM counter-part of that shown in FIG. 20B, where more signal power is allocated to MBS-BH. This configuration allows greater difference between detection performance at the RTS of the MSB-BH and FBS-BH, as it allows combining different channel and modulation coding for the MBS backhaul versus FBS backhaul with the different transmission power levels that are allocated to them.

Figure 21:
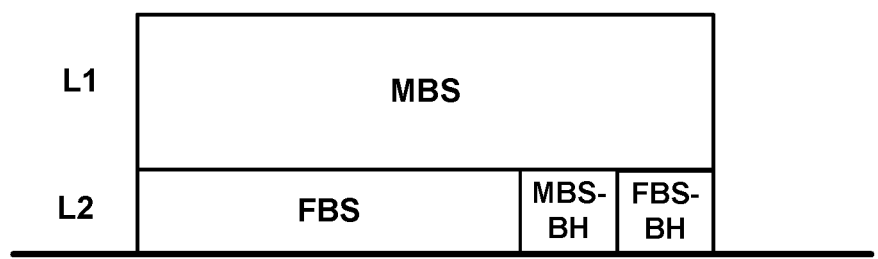
FIG. 21 is a schematic diagram of an LDM signal block carrying MBS backhaul and FBS backhaul in different L2 PLPs.

FIG. 21 illustrates a version of a transmission signal block of FIG. 15C in which L1 layer signals carry MBS, while L2 layer signals carry FBS and also backhaul for FBS and MBS in different PLPs. The MBS-BH and FBS-BH can be delivered using different coding and modulation. The MBS-BH can use a more robust transmission mode so when the FBS-BH detection fails, the RTS may still deliver a robust mobile service (MBS) in the L1 layer. The transmission signal of this configuration may be processed at an RTS generally as described above with reference to FIGS. 15C-17.

Using the L2 signal layer of a two-layer LDM for in-band backhaul delivery may impose a penalty on L2 service throughput. For example, for L1 layer services encodes with (QPSK, 6/15 LDPC) codes and L2 layer services encoded with higher-capacity (64QAM, 10/15 LDPC) codes, 20% of the L2 layer capacity may have to be dedicated for the L1 signals backhaul, and is therefore not available for L2 service delivery to end-users within the coverage area of the primary TS emitting the transmission signal with the in-band backhaul, such as PTS 131 of MCS 100. The impact of in-band backhaul on the service delivery capacity can be at least partially lessened by adding a third signal layer (L3).

For example, a third LDM signal layer can be added to the current two-layer ATSC 3.0 signal to deliver backhaul data for CL (L1) mobile service. This third signal layer may have signal power lower than that of the EL (L2), for example by 5-10 dB or more, and may be configured with strong coding and modulation format that is similar to those used for the CL mobile services. In order for an RTS to decode the backhaul data in this 3rd signal layer, a sufficient SNR (signal-noise ratio) at the RTS may be required to first decode and cancel both CL and EL signals. To provide a suitably high SNR, the RTS may be provided for example with a high dynamic range tuner, and/or a directional antenna at high elevation.

Figure 22:
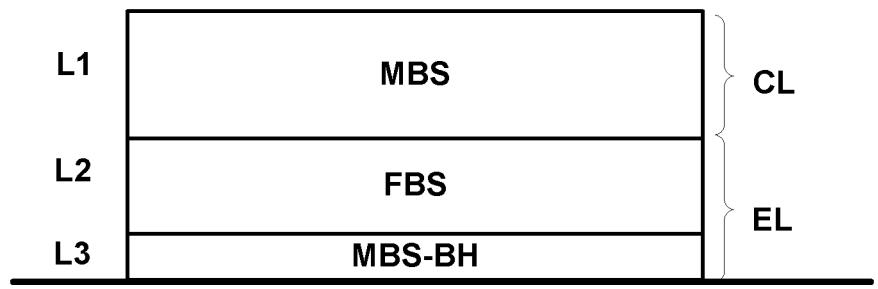
FIG. 22 is a schematic diagram of an LDM signal block carrying MBS backhaul in a third LDM layer.
Figure 23A:
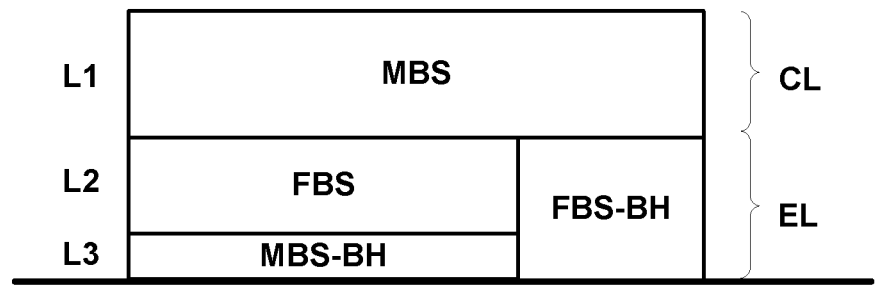
FIG. 23A is a schematic diagram of an LDM signal block carrying MBS backhaul in a third (L3) LDM layer and FBS backhaul in the L2 layer in different time slots.
Figure 23B:
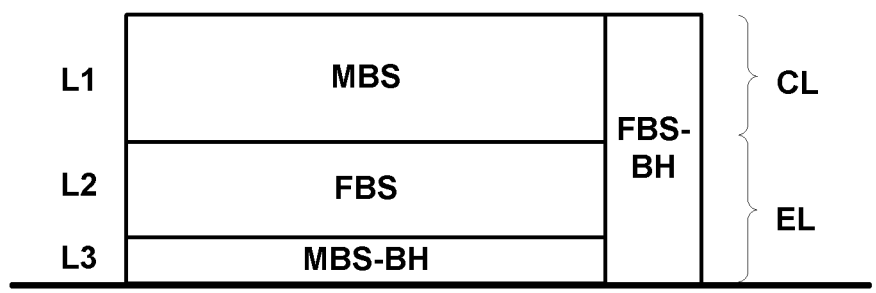
FIG. 23B is a schematic diagram of an LDM signal block carrying MBS backhaul in a third (L3) LDM layer and FBS backhaul in a single-layer time slot.

FIGS. 22, 23A, and 23B illustrate two example scenarios of using a three-layer LDM signal structure for backhaul data transmission. Referring first to FIG. 22, the in-band backhaul signal in this embodiment includes only the mobile services and is delivered in the third (L3) LDM layer of a transmission signal, while the L1 and L2 signal layers of the transmission signal carry the MBS and FBS, respectively, to the end-users. Since no L2 layer capacity is used for backhaul data transmission, the full capacity of the L2 layer may be reserved for high data rate fixed service transmission, for example to support fixed 4k-UHD services. However, only robust mobile service layer signal may be re-transmitted for indoor public places.

Referring to FIGS. 23A and 23B, in other embodiments the in-band backhaul signal may be partly delivered in the L3 layer of a transmission signal and partly—in either the L2 layer thereof or in a single-layer time slot. FIG. 23A illustrates an example scenario wherein the transmission signal carries FBS backhaul "FBS-BH" in the L2 signal layer and the MBS backhaul "MBS-BH"—in the L3 signal layer. The L1 backhaul data and L2 backhaul data are transmitted using separate PLPs, which may reduce their L2 spectrum usage and therefore also reduce the impact to fixed EL4k-UHD service, for example. The MBS-BH may be transmitted in a different time slot than the FBS-BH, which may help to achieve a higher SNR for the FBS-BH reception due to the absence of interference from the $3^{rd}$ signal layer, so that FBS-BH signals can use coding and modulation formats with greater information carrying capacity. FIG. 23B illustrates an LDM signal block carrying the MBS backhaul in the L3 layer and the FBS backhaul in a dedicated single-layer time slot. Furthermore, MIMO technology can be implemented on the FBS-BH signals in this scenario to further reduce the bandwidth requirement of the in-band backhaul; by way of example, using a 2×2 MIMO can reduce the bandwidth requirement by about 50%. Detection of the L3 signals may generally follow one of the processes described above with reference to FIGS. 16 and 17, in which signal cancellation steps or operations include cancelling both L1 and L2 layer signals. An accurate channel estimator for high-performance L1 or (L1+L2) signal cancellation, which may be for example pilot-based, and an accurate channel estimator for L2 or L3 signal detection, for example TxID-based, may be used in some embodiments.

Although the use of a third LDM layer in a transmission signal may not be compatible with the ATSC 3.0 transmitters, transmission signals carrying in-band backhaul in a third LDM layer may be fully backward compatible with consumer receivers configured for a two-layer LDM, which may simply ignore the presence of the third LDM layer.

In each of the embodiments illustrated in FIGS. 20a-22, IBBH signals carrying the backhaul data for each service may be emitted with a lead time T ahead of the service signals carrying corresponding service to the end-users. The lead time T may be equal or greater than all propagation and processing time delays, from the Tx antenna of the primary TS emitting the transmission signal with the in-band backhaul, such as the Tx antenna 125 of PTS 131, to the Tx antenna of an RTS re-transmitting the corresponding service signal, such as the Tx antenna 155 of RTS 150. In some embodiments this lead time T may be set at a transmission frame duration, or a multiple thereof.

Figure 24:
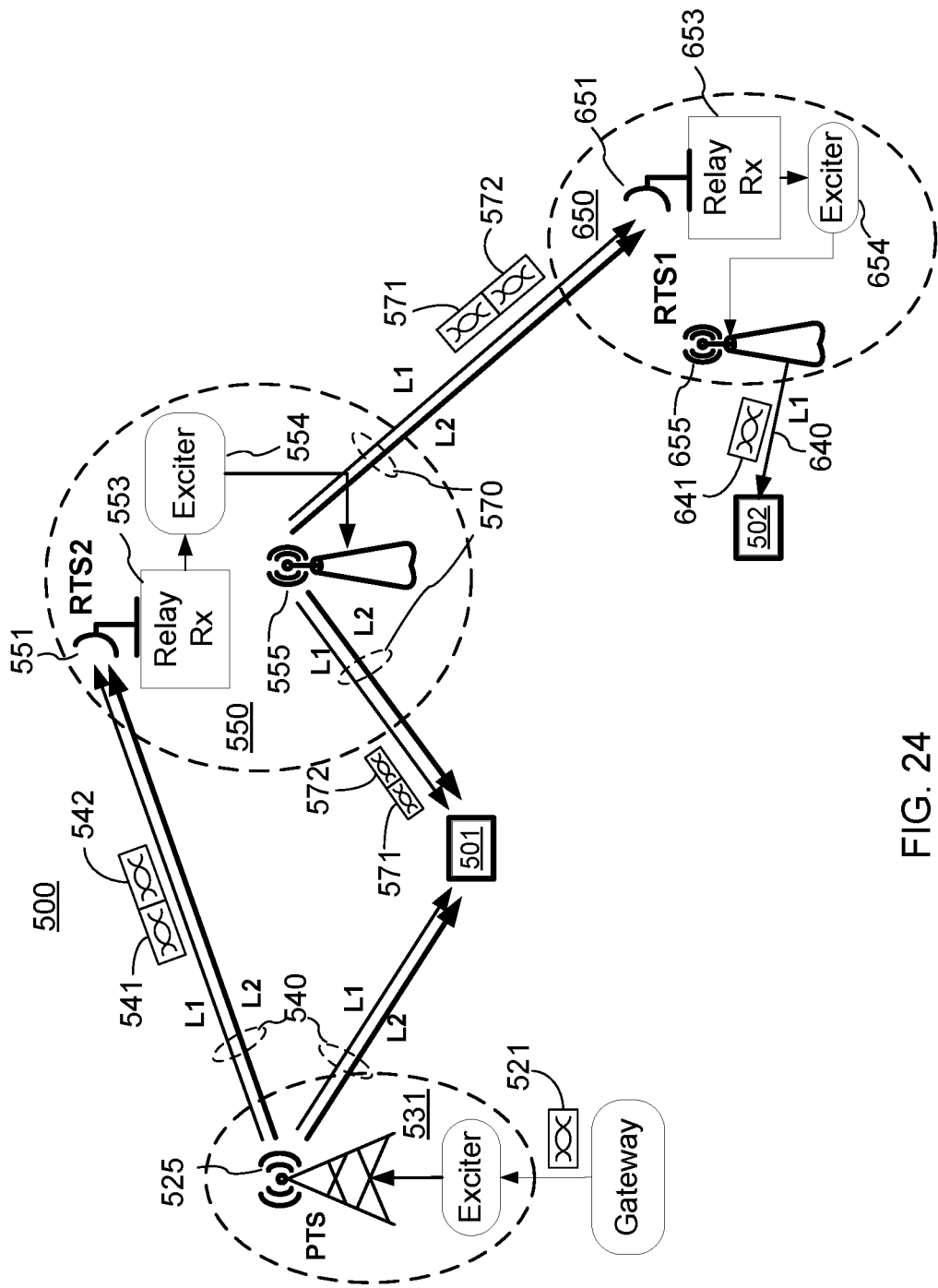
FIG. 24 is a schematic diagram of an example MCS implementing LDM and in-band multi-hop transmission of backhaul data to several RTSs in series.

Referring to FIG. 24, there is illustrated an MCS 500 implementing a multi-hop relay using LDM-assisted in-band backhaul signal delivery. MCS 500 may be an embodiment of MCS 100. Although a two-hop relay system is shown by way of example, an extension to a greater number of hops would be evident to those skilled in the art on the basis of the present description. MCS 500 may be configured as an SFN, so that each TS or RTS in the system transmits services over a same carrier frequency. Furthermore, there may be a common set of services that each TS and RTS in the MCS 500 transmits to end-users. In order to support the transmission of a common set of services over the same carrier frequency in a multi-hop relay with in-band backhaul delivery, the MCS 500 may be configured to suitably time the signal emission by different RTSs. FIG. 25 illustrates the timing control of a n-hop relay system.

In the embodiment in FIG. 24, MCS 500 includes a PTS 531, a first RTS (RTS1) 650, and a second RTS (RTS2) 550, each of which including an exciter and a Tx antenna configured to emit transmission signals 540, 570, or 640 carrying service data to end-users in its coverage area. The exciters may be configured to generate transmission waveforms based on backhaul data they receive and feed them to respective Tx antennas. The Tx antennas may be located at transmission towers or at other suitable locations, which may be at high altitude. A broadcast gateway (BGW) station provides first backhaul signals 521 to PTS 531 via dedicated wired or wireless STL link. The first backhaul signals 521 may contain service data for a plurality of services, such as for example MBS and FBS, and may further include transmission control parameters, such as timing offset(s), frequency offset(s), transmission power, etc., which may be TS-specific.

RTS2 550 includes an Rx antenna 551, a relay receiver 553, an exciter 554, and a Tx antenna 555. RTS1 650 includes an Rx antenna 651, a relay receiver 653, an exciter 654, and a Tx antenna 655. RTS2 550 and RTS1 560 may each be configured to receive backhaul data in-band with a transmission signal from other TS in the MCS 500 that also carrier service signals to end-users. RTS2 550 and RTS1 560 may each be an embodiment of RTS 150 of MCS 100.

In the illustrated embodiment PTS 531 is configured to emit a first transmission (Tx1) signal 540 carrying service signals 541 for end-users 501 and first IBBH signals 542 using two or more LDM layers, including the L1 signal layer and the L2 signal layer as described above. The first IBBH signals 542 may include service data to be retransmitted by RTS2 550 and/or RTS1 650, and may also include control signaling for configuring transmission parameters of RTS2 and RTS1, for SFN transmitter coordination, which may include transmitter timing offset(s) and power level parameters to coordinate, synchronize, and/or optimize the SFN service coverage.

RTS2 550 is configured to receive, with its Rx antenna 551, the Tx1 signal, extract the first IBBH signals 542 therefrom, and use the extracted first IBBH signals 542 to generate and transmit a second transmission (Tx2) signal 570 carrying service signals 571 directed to end-users 501 and second IBBH signals 572. The service signals 541 and 571 transmitted by PTS 531 and RTS2 550, respectively, at least partially overlap to deliver a common set of services. In some embodiments both the service signals 571 and 541 deliver the same MBS and FBS sets to the end-users 501. The Tx2 signal 570 may be formed using LDM to include at least the L1 signal layer and the L2 signal layer. The Rx antenna 551 of RTS2 550 may be positioned where it can reliably receive the Tx1 signal 540 from PTS. The relay receiver 553 of RTS2 550 may be an embodiment of the relay receiver 153 of RTS 150 described above; it may be configured to detect and extract the first IBBH signals 542 from the received Tx1 signal 540, and to provide extracted backhaul data to the exciter 554 for re-encoding and re-modulating to form transmission waveforms. The relay receiver 553 may be further configured to provide at least a portion of backhaul data received with the first IBBH signals 542 to the exciter 554 for including in the second IBBH signals 572 carried by the Tx2 signal 570. The second IBBH signals 572 may include service data to be retransmitted by RTS1 650, and may also include control signaling for configuring transmission parameters of RTS1 650, for SFN transmitter coordination, which may include transmitter timing offset(s) and power level parameters to coordinate, synchronize, and/or optimize the SFN service coverage.

RTS1 650 is configured to receive, with its Rx antenna 651, the Tx2 signal 570, extract the second IBBH signals 572 therefrom, and use the extracted second IBBH signals 572 to generate and transmit a third transmission (Tx3) signal 640 carrying service signals 641. In some embodiments RTS1 may be located where it can provide services to end-users 502 that are not serviced, or inadequately serviced, by PTS 531 and RTS2 550. The Tx3 signal 640 may be a single-layer signal in which the service signals 641 are carried in the L1 signal layer, or a multilayer LDM signal. The Rx antenna 651 of RTS1 650 may be positioned at a location where it can reliably receive the Tx2 signal 570 from the Tx antenna 555 of RTS2 550. The relay receiver 653 of RTS1 650 may be an embodiment of the relay receiver 153 of RTS 150 described above; it may be configured to detect and extract the second IBBH signals 572 from the received Tx2 signal 570, and to provide extracted backhaul data to the exciter 654 for re-encoding and re-modulating to form transmission waveforms. The exciter 654 is configured to generate transmission waveforms from service data provided with the extracted backhaul signals, and to feed them to the Tx antenna 655 for transmitting as the Tx3 signal 640.

Figure 25A:
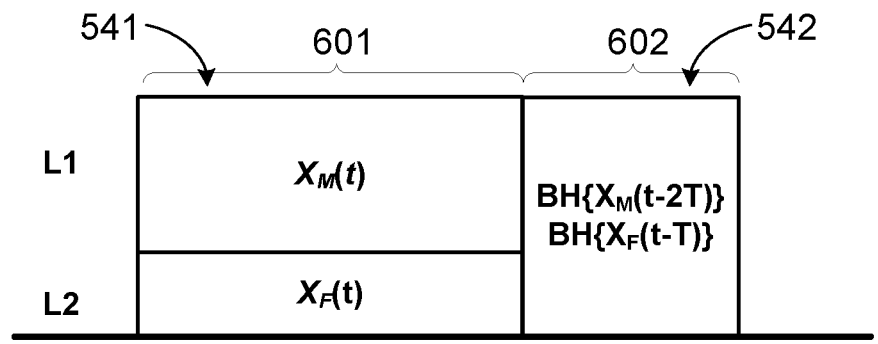
FIG. 25A is a schematic diagram of a signal block transmitted by a primary TS of FIG. 24 with a time-advanced first in-band backhaul data for L1 and L2 layer services in a different time slot from L1 and L2 service signals.
Figure 25B:
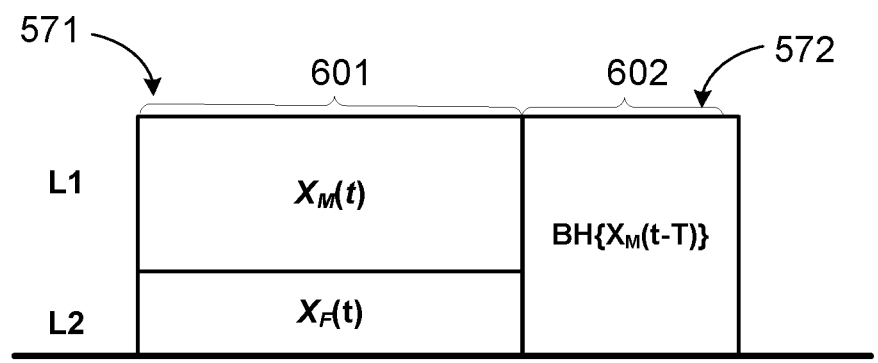
FIG. 25B is a schematic diagram of a signal block transmitted by a first RTS (RTS2) of FIG. 24 with time-advanced second in-band backhaul data for L1 layer services replacing the first in-band backhaul in the signal block of FIG. 25A.
Figure 25C:
FIG. 25C is a schematic diagram of a signal block of the signal last transmitted by the last RTS in the chain with a training sequence replacing the second in-band backhaul data of the signal of FIG. 25B.

FIGS. 25A-C illustrate example transmission signal (Tx) blocks of the Tx1 signal 540, Tx2 signal 570, and Tx3 signal 640, respectively, for an embodiment in which the service signals and the backhaul signals are transmitted in different timeslots 601 and 602, respectively, of the corresponding Tx blocks.

FIG. 25A illustrates a Tx block of the Tx1 signal 540 transmitted by the primary TS 531, with the service signals 541 transmitted in timeslot 601 and the first IBBH signals 542 transmitted in timeslot 602. The service signals 541 are composed of L1 layer service signals $X_M(t)$ and L2 layer service signals $X_F(t)$. In some embodiments the L1 layer service signals $X_M(t)$ may be carrying MBS data while the L2 layer service signals $X_F(t)$ may be carrying FBS data. The IBBH signals 542 BH{$X_F$, $X_M$} in this embodiment carry backhaul data for both the L1 layer services and the L2 layer services.

FIG. 25B illustrates a Tx block of the Tx2 signal 570 transmitted by RTS2, with the service signals 571 transmitted in timeslot 601 and the second IBBH signals 572 transmitted in time slot 602. The service signals 571 are composed of the L1 layer service signals $X_M(t)$ and the L2 layer service signals $X_F(t)$. RTS2 550 may be configured to perform backhaul detection as described above with reference to FIGS. 16 and 17, using the backhaul signals 572 as the training sequence for loopback channel estimation. The IBBH signals 572 BH{$X_M$} in this embodiment may carry backhaul data for the L1 layer services only.

FIG. 25C illustrates a Tx block of the Tx3 signal 640 transmitted by RTS1, with the service signals 641 transmitted in timeslot 601 and a training sequence transmitted in timeslot 602. The service signals 571 are composed of the L1 layer service signals $X_M(t)$. RTS1 650 may be configured to perform backhaul detection as described above with reference to FIGS. 16 and 17, using the training sequence for loopback channel estimation.

Referring to FIGS. 24, 25A-25 C, in embodiments where end-users 501 may receive the L1 layer service signals $F_M(t)$ from each of PTS 531, RTS1 650, and RTS2 550, the emission of these signals by PTS 531, RTS1 650, and RTS2 550 should be suitably synchronized. To facilitate this, PTS 531 may be configured to emit backhaul signals BH{$X_M$} carrying the L1 level services with a lead time $T_B$ at least equal to the total time delay associated with the backhaul signal propagation and processing from PTS 531 to the last RTS in the chain, or RTS1 650 in the example of FIG. 24. In some embodiments the system may be configured to allocate a same "one-hop" lead time T for each backhaul transmission "hop" or "leg", which may be at least equal to the longest time delay associated with the backhaul signal propagation and processing between two consecutive transmitters in the chain. Accordingly, PTS 531 may be configured to emit backhaul signals BH{$X_M(t-2T)$} carrying the L1 level services with a lead time 2T relative to the emission of the corresponding L1 service signals $X_M(t)$.

Since in the example of FIG. 24 the last RTS in the chain, RTS1 650, does not emit L2 layer service signals, PTS 531 may be configured to emit backhaul signals BH{$X_F(t-T)$} carrying the L2 level services with a lead time T relative to the emission of the corresponding L2 service signals $X_F(t)$. RTS2 550 may be configured to add an additional time delay of T when generating the L1 layer service signals $F_M(t)$. In other embodiments PTS 531 may be configured to emit backhaul signals for both the L1 layer and L2 layer services, BH{$X_M(t-2T), X_F(t-2T)$} with a lead time 2T relative to the emission of the corresponding L1 and L2 service signals $X_M(t)$, $X_F(t)$, and RTS2 may be configured to add an additional time delay of T to both of the L1 layer service signals $F_M(t)$ and the L2 layer service signals $F_F(t)$ when generating these service signals from the backhaul signals BH{$X_M(t-2T), X_F(t-2T)$}.

Figure 26:
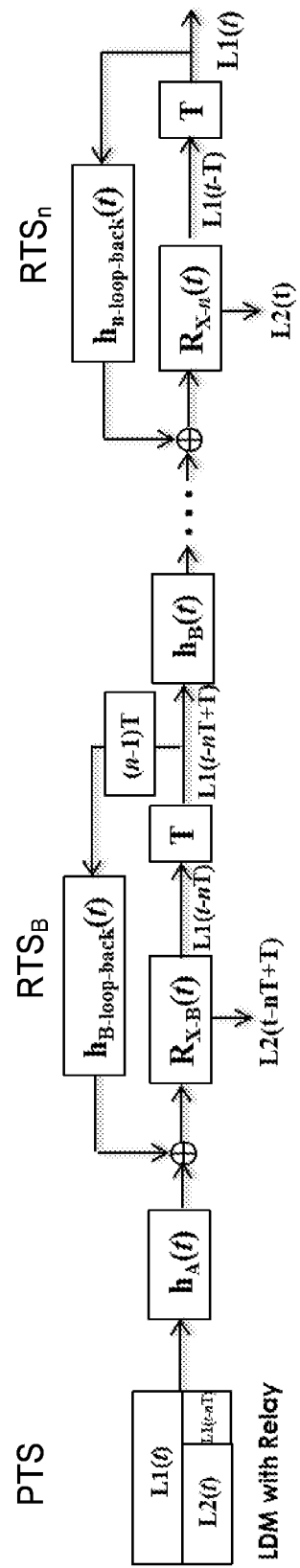
FIG. 26 is a schematic functional block diagram of signal transformation and processing for a multi-hop delivery and processing of in-band backhaul in a chain of N transmitters.

FIG. 26 schematically illustrates timing of backhaul emission in an embodiment wherein backhaul signals are transmitted in-band along a chain of n>2 consecutive TSs. Here "$h_A(t)$" and "$h_B(t)$" represent signal propagation channels from a PTS to a first RTS in the chain "$RTS_B$", and from "$RTS_B$" to a next RTS in the chain (not shown), "$h_{B-loopback}(t)$" and "$h_{n-loopback}(t)$" represent loopback channels between Tx and Rx antennas in $RTS_B$ and the last RTS in the chain, "$RTS_n$", respectively. "$R_{X-B}(t)$" and "$R_{X-n}(t)$" represent signal processing operations at $RTS_B$ and $RTS_n$ that may include channel estimation, equalization, loop-back compensation, demodulation and decoding, re-encoding and re-modulation, and related signal processing, as described hereinabove. Delay "nT" may be longer than the delay associated with all multi-hop propagation as well as signal processing related to backhaul signal extraction and re-coding and re-modulation.

Figure 27A:
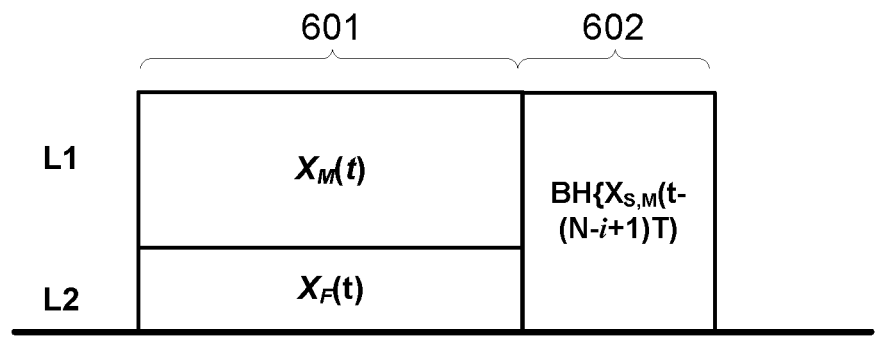
FIG. 27A is a schematic diagram of a signal block received by an i-th RTS of an N-hop RTS chain of FIG. 26, with a time-advanced in-band backhaul for L1 and L2 layer services in a separate time slot.
Figure 27B:
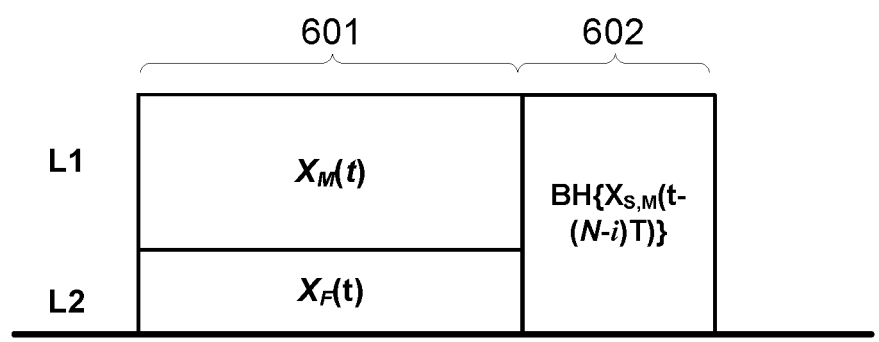
FIG. 27B is a schematic diagram of a signal block transmitted by the i-th RTS of the N-hop RTS chain of FIG. 26.
Figure 27C:
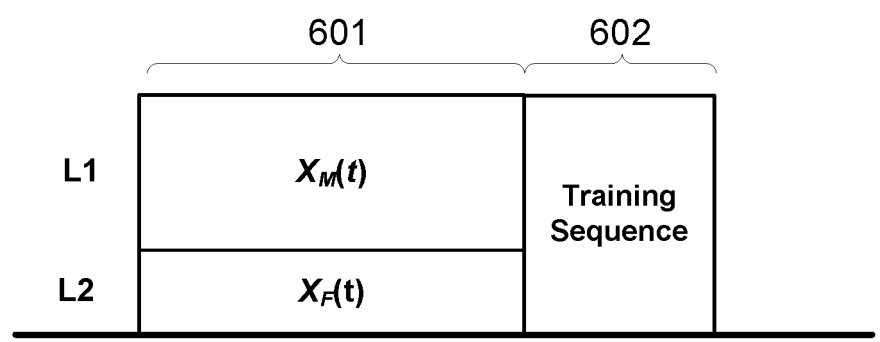
FIG. 27C is a schematic diagram of a signal block transmitted by the last RTS in the N-hop RTS chain of FIG. 25, with a training sequence replacing the in-band backhaul in the signal of FIG. 27B.

FIGS. 27A-C illustrate example transmission signal blocks that may be used by an i-th RTS and the last RTS in an N-hop section of an SFN system of the type illustrated in FIGS. 24 and 25. In the illustrated embodiment the L1 and L2 service signals $X_M(t)$, $X_F(t)$ and the in-band backhaul signals BH{$X_F, X_M$} for the L1 and L2 services are transmitted in different timeslots 601 and 602, respectively. FIG. 27A illustrates a signal block of a Tx signal received by the i-th RTS in the N-hop RTS chain, with the L1-layer service signal $X_M(t)$, the L2-layer service signal $X_F(t)$, and the backhaul signal BH{$X_{S,M}(t-(N+1-i)T)$} that is emitted with a lead time of $(N+1-i)T$ ahead of the transmission of the corresponding service signals. FIG. 27B illustrates a signal block of a Tx signal emitted by the i-th RTS, with the L1-layer service signal $X_M(t)$, the L2-layer service signal $X_F(t)$, and the backhaul signal BH{$X_{S,M}(t-(N+1-i)T)$} that is emitted with a lead time of $(N-i)T$ ahead of the transmission of the corresponding service signals. FIG. 27C illustrates a signal block of a Tx signal emitted by the last RTS, with the L1-layer service signal $X_M(t)$, the L2-layer service signal $X_F(t)$, and with a known training signal transmitted in the time slot 602 of the in-band backhaul, replacing the in-band backhaul signal.

Principles of the in-band backhaul transmission that are described hereinabove with reference to SFN-type systems, such as for example, but not exclusively, those compliant with the ATSC 3.0 standards, may also be applied to other types of wireless communication systems including, but not limited to, LTE, 5G, and future broadband wireless systems to support both multicast/broadcast transmission, mixed broadcast/unicast transmission, and unicast transmission scenarios. The 2-layer and 3-layer LDM techniques described hereinabove for broadcasting in-band backhaul for SFN operation may be directly applicable to the Multimedia Broadcast multicast service Single Frequency Network (MBSFN) defined in LTE and 5G broadcast. For mixed broadcast-unicast delivery, L1 (CL) layer of LDM may be used for broadcast services, where L2 (EL) layer is used to deliver L1 (CL) relay backhaul and unicast service or unicast relay backhaul.

FIGS. 28A-28D illustrate transmission blocks for four example application scenarios that may be applicable to LTE evolution and 5G. FIG. 28A illustrates an embodiment wherein the L2 layer of a 2-layer LDM transmission block carries broadcast backhaul data for L1 broadcast services. The broadcast backhaul data for L1 broadcast services may also be carried in a single-layer time slot. FIG. 28B illustrates an embodiment with mixed Unicast/Broadcast service delivery wherein the L2 layer of a 2-layer LDM transmission block carries time-concatenated unicast signals "UE-1", "UE-2", UE-3" targeting different end users and also broadcast backhaul data for L1 broadcast services. The broadcast backhaul may also be carried in a single-layer time slot. In some embodiments, the unicast signals and the broadcast backhaul may be delivered in a same time slot or overlapping time slots using frequency division multiplexing (FDM). FIG. 28C illustrates an embodiment with mixed broadcast/broadband-backhaul delivery wherein the L2 layer of a 2-layer LDM transmission block carries backhaul data for L1 MBS and also broadband backhaul data for broadband services that is not delivered within the same transmission signal. The broadcast backhaul may also be carried in a single-layer time slot. FIG. 28D illustrates another embodiment with mixed Unicast/Broadcast service delivery wherein the L1 layer of a 2-layer LDM transmission block delivers broadcast service signals and additional services such as, but not limited to, IoT (internet of things) signalling, and the L2 layer carries time-concatenated unicast signals targeting different end users and also broadcast backhaul data for L1 broadcast services. In some embodiments, different services that are delivered in a same LDM layer may be delivered in a same or overlapping time slots using frequency division multiplexing (FDM). In some embodiments, the broadcast backhaul may be transmitted in a single-layer time slot that is time-multiplexed with a multi-layer transmission time slot carrying service signals.

Figure 29A:
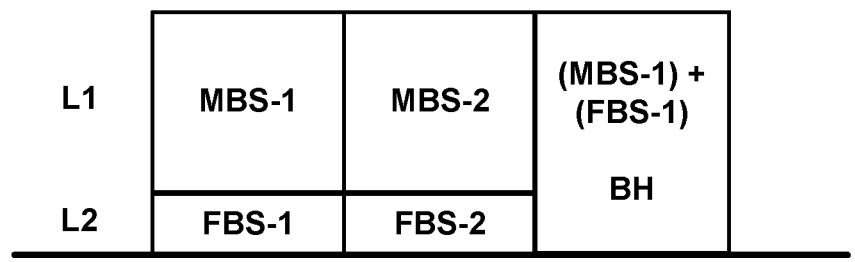
FIG. 29A is a schematic diagram of an LDM signal block carrying four services to end-users in two LDM layers, and in-band backhaul for only two of the four services.

Furthermore the in-band backhaul can be used to deliver backhaul signals for selective broadcasting services, among all L1 mobile and L2 fixed services. FIG. 29A illustrates an example signal structure for an embodiment where a primary TS delivers four services, MBS-1 and MBS-2 in the L1 layer and FBS-1 and FBS-2 in the L2 layer, with the in-band backhaul PLP only delivering backhaul data for two services (MBS-1 and FBS-1).

Figure 29B:
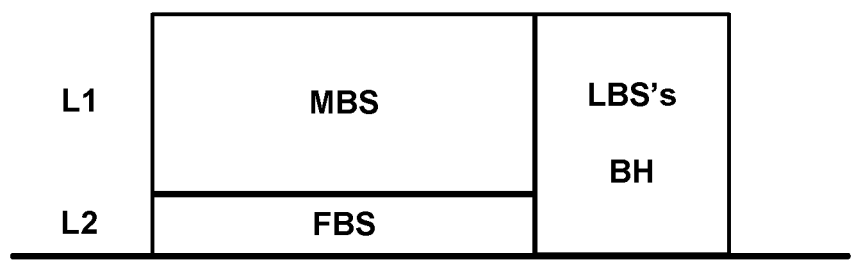
FIG. 29B is a schematic diagram of an LDM signal block carrying mobile and fixed broadcast services and backhaul data for local broadcast services (LBS) only.
Figure 29C:
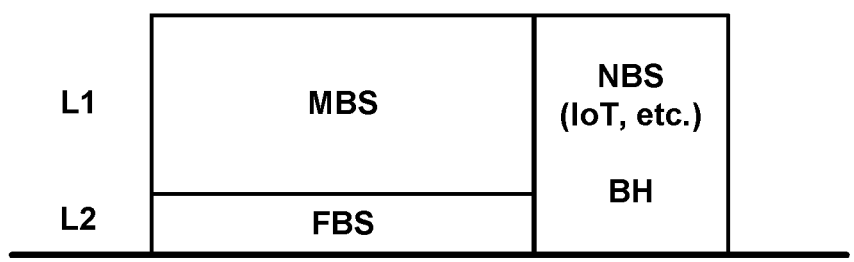
FIG. 29C is a schematic diagram of an LDM signal block carrying mobile and fixed broadcast services and backhaul data for other services no provided by the primary TS.

The in-band backhaul can be also used by a primary TS to deliver backhaul data for broadcast services that are different than the services delivered by the primary TS to end-users. FIG. 29B illustrates an example signal block of a Tx signal emitted by the primary TS in an embodiment wherein an RTS that receives the in-band backhaul from the primary TS may operate on the same frequency as the primary TS, but delivers its own local broadcast services (LBS). In such embodiments timing coordination of the service signals emission and the backhaul signals emission may not be needed. FIG. 29C illustrates an example signal block of a Tx signal emitted by a primary TS in an embodiment where the in-band backhaul is used to deliver backhaul data for other services, such as Internet of Things (IoT), connected vehicles, etc., No backhaul timing control is needed when the RTS emit different services than the primary TS.

Figure 12B:
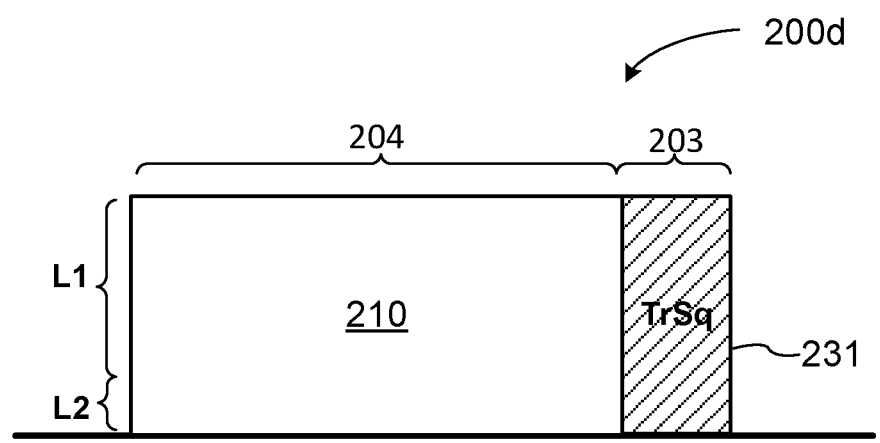
FIG. 12B is a schematic diagram of a signal block of an RTS re-transmitted signal with a training sequence replacing the in-band backhaul data of the signal of FIG. 12A in its time slot.

Several embodiments described hereinabove use unique sequences in an RTS transmission signal, such as Tx2 signal 142, to assist in loopback channel estimation and cancellation at the RTS. Some embodiments may utilise the TxID sequence or signal 353 (FIG. 11) such as that defined in ATSC 3.0 for the loopback signal identification and the loopback channel estimation. In other embodiments, the RTS may add a training sequence to the transmission signal it emits which is unique to the RTS. Here and in the contest of this specification the term "unique" means that no other TS in the same network transmit signals with such sequence at the same carrier frequency. FIGS. 12B, 15B, 15D illustrate embodiments where the training sequence replaces the backhaul signals in their timeslot. It will be appreciated thought that a training sequence may be added in various ways to assist in loopback signal detection, all of which would be within the context of the present disclosure.

Figure 30:
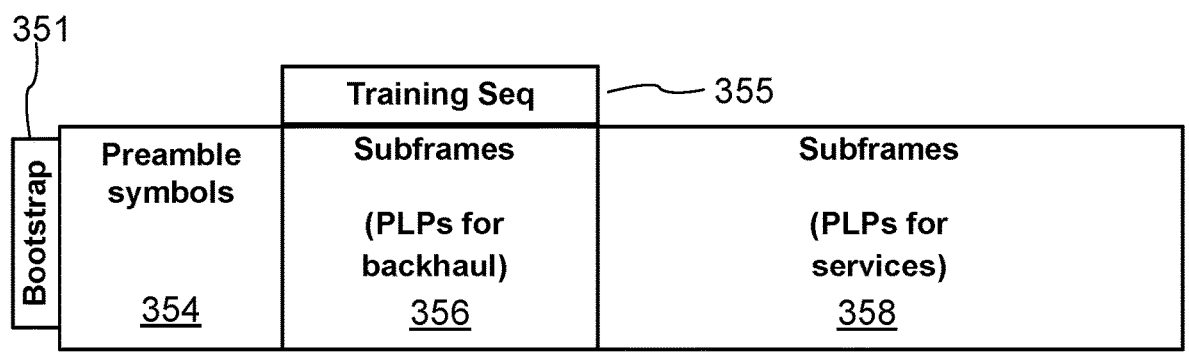
FIG. 30 is a schematic diagram of an ATSC 3.0 signal frame with a superimposed low-power training sequence.

FIG. 30 illustrates an example embodiment wherein a low-power embedded training signal 355, which may be for example generated from a pseudo-random sequence, is added to the signal re-emitted by an RTS over subframe(s) 356, which in the Tx1 signal generated by the PTS were carrying the in-band backhaul. This training signal 355 can be used for loopback channel estimation and loopback signal cancelation by the RTS to detect the in-band backhaul. In some embodiments the training signal 355 may extend over an entire frame, except the bootstrap signal. In some embodiments the training signal 355 may be embedded only on top of the subframes 358 carrying service signals.

The above-described exemplary embodiments are intended to be illustrative in all respects, rather than restrictive, of the present invention. Indeed, various other embodiments and modifications to the present disclosure, in addition to those described herein, will be apparent to those of ordinary skill in the art from the foregoing description and accompanying drawings.

For example, it will be appreciated that in some embodiments an RTS may retransmit at least a part of service data received with an IBBH signal at a carrier frequency that is different from the carrier frequency of the IBBH signal carrying the service data, or in a frequency channel that does not overlap with the frequency channel of the IBBH signals. By way of example, a TS of a multi-cast communication system may transmit IBBH signals carrying service data for a cellular communication system, or service data for other services such as Connected Cars, Internet-of-Things, etc. In such embodiments no loopback channel estimation or loopback signal cancellation may be need at the RTS. Furthermore, in some embodiments where a PTS transmits IBBH signals in a backhaul-dedicated timeslot, such as for example described above with reference to FIGS. 12A, 15A, 18B, 20A-C, 23B, 25A-B, 27A-B, 29A-C, the RTS may be configured to substantially null its transmission power in the backhaul timeslot, i.e. to transmit substantially no signal, or only a very weak signal, in the backhaul timeslot, so as to bring the loopback signal at the Rx antenna of the RTS to a level sufficiently low in the backhaul timeslot, so that no loopback signal cancellation at the RTS is needed to detect and extract the IBBH signal. Furthermore in some embodiments a PTS transmitting and an RTS receiving the IBBH signals for re-transmitting may not be transmitting the same service signals; in such embodiments there may be no need for the PTS to transit the IBBH signals ahead of the service signals. Embodiments and techniques described hereinabove may be straightforwardly modified to encompass such situations.

Furthermore, although the description hereinabove may include mathematical equations to assist in understanding of some features of the example embodiments being described, the principles of operation and main features of the described embodiments do not necessarily depend on the accuracy or validity of the equations.

Furthermore in the description above, for purposes of explanation and not limitation, specific details are set forth such as particular architectures, interfaces, techniques, etc. in order to provide a thorough understanding of the present invention. In some instances, detailed descriptions of well-known devices, circuits, and methods are omitted so as not to obscure the description of the present invention with unnecessary detail. Thus, for example, it will be appreciated by those skilled in the art that block diagrams herein can represent conceptual views of illustrative circuitry embodying the principles of the technology. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Furthermore, it will be appreciated that each of the example embodiments described hereinabove may include features described with reference to other example embodiments.

Thus, while the present invention has been particularly shown and described with reference to example embodiments as illustrated in the drawing, it will be understood by one skilled in the art that various changes in detail may be affected therein without departing from the spirit and scope of the invention as defined by the claims.

What is claimed is:

1. A multicast communication system (MCS) comprising:
   a primary transmitter station (PTS) configured to wirelessly transmit a first transmission (Tx) signal comprising a first (L1) signal layer and a second (L2) signal layer, wherein the L2 signal layer is superimposed over the L1 signal layer using layered division multiplexing (LDM), wherein the L1 signal layer comprises L1 service signals carrying first service data to end-users, and wherein the PTS is further configured to include in-band backhaul (IBBH) signals in the first Tx signal; and,
   a first relay transmitter station (RTS) configured to:
   receive a relay signal comprising the first Tx signal;
   extract the IBBH signals contained in the first Tx signal; and,
   transmit a second Tx signal comprising backhaul service data obtained from the IBBH signals.

2. The MCS of claim 1 wherein the first Tx signal and the second Tx signal share wireless spectrum, wherein the backhaul service data comprises the first service data, and the PTS is configured to transmit the IBBH signals ahead of transmitting the first service data by a lead time T, wherein the lead time T is selected so as to synchronize transmission of the first service data by the PTS and the first RTS.

3. The MCS of claim 2 wherein the PTS is configured to transmit L2 service signals in the L2 signal layer, the L2 service signals comprising second service data, and wherein the IBBH signals comprise the second service data.

4. The MCS of claim 2 wherein the PTS is configured to transmit the IBBH signals in the L2 signal layer, and the first RTS is configured to perform signal processing operations comprising:
   cancelling the L1 signal layer from the received relay signal, or a signal obtained therefrom, to obtain a first remainder signal comprising the L2 signal layer of the first Tx signal;
   detecting the IBBH signals in the first remainder signal, and extracting the first service data therefrom; and
   encoding the first service data for transmitting with the second Tx signal.

5. The MCS of claim 4 wherein the first RTS is further configured to:
   perform a combined forward and loopback channel estimation and equalization of the received relay signal, and
   perform a forward channel estimation and equalization of the first remainder signal, or a signal obtained therefrom, to recover the L2 signal layer of the first Tx signal.

6. The MCS of claim 4 wherein:
   the PTS and the first RTS are each configured to transmit L2 service signals in the L2 signal layer, the L2 service signals comprising second service data;
   the PTS is further configured to include the second service data into the backhaul service data carried by the IBBH signals; and
   the first RTS is further configured to perform signal processing operations comprising:
   a loopback channel estimation to estimate a contribution of the L2 signal layer of the second Tx signal in the first remainder signal;
   cancelling the contribution of the L2 signal layer of the second Tx signal from the first remainder signal to obtain a second remainder signal comprising the L2 signal layer of the first Tx signal;
   detecting the IBBH signals in the second remainder signal; and,
   encoding the first service data extracted from the from the IBBH signals for transmitting in the L1 signal layer of the second Tx signal, and encoding the second service data extracted from the from the IBBH signals for transmitting with the L2 signal layer of the second Tx signal.

7. The MCS of claim 2 wherein the PTS is configured to transmit the IBBH signals in a backhaul time slot, and wherein the first RTS is configured to: transmit the second Tx signal comprising a distinct training signal in the backhaul time slot, and to perform loopback signal estimation based on the distinct training signal.

8. The MCS of claim 1 wherein the first RTS comprises:
   a receive (Rx) antenna for receiving the relay signal;
   a relay receiver configured to perform signal equalization on the received relay signal, to retrieve a portion of the first Tx signal comprising the IBBH signals, and to extract the backhaul service data therefrom;
   an exciter comprising a Tx signal encoder operatively followed by an RF transmitter and configured to generate a second Tx signal waveform based on the backhaul service data extracted from the first Tx signal; and
   a transmit (Tx) antenna configured to transmit the second Tx signal.

9. The MCS of claim 8 wherein at least one of the following conditions holds:
   the Tx antenna is located in a minimum of a reception pattern of the Rx antenna, the Rx antenna is located in a minimum of a transmission pattern of the Tx antenna, or the Rx antenna is located in a shadow of an object that at least partially shields the Rx antenna from the Tx antenna.

10. The MCS of claim 8 wherein the first Tx signal and the second Tx signal share wireless spectrum, wherein the relay receiver is configured to estimate a loopback signal from the Tx antenna to the Rx antenna of the first RTS, and to cancel a contribution of the loopback signal from the received relay signal or a signal obtained therefrom.

11. The MCS of claim 10 wherein the exciter is configured to insert a distinct training signal in the second Tx signal waveform, and wherein the relay receiver is configured to perform a loopback channel estimation using the distinct training signal.

12. The MCS of claim 1 wherein the first Tx signal and the second Tx signal share wireless spectrum, wherein the PTS is configured to transmit the IBBH signals in a backhaul time slot, wherein the first Tx signal is absent of the L1 service signals in the backhaul time slot, and wherein the first RTS is configured to perform signal processing operations comprising:

estimating a loopback channel for the backhaul time slot;

cancelling a contribution of the second Tx signal into the received relay signal in the backhaul time slot;

detecting the IBBH signals in the backhaul time slot containing the backhaul service data; and encoding the backhaul service data for transmitting with the second Tx signal.

13. The MCS of claim 12 wherein detecting the IBBH signals comprises forward channel estimation and equalization.

14. The MCS of claim 1 wherein the first RTS is configured to distinguish between the first Tx signal and the second Tx signal in the relay signal based on a transmitter identification (TxID) signal contained in one of the first Tx signal or the second Tx signal.

15. The MCS of claim 1 wherein:

the PTS comprises a multi-element transmit antenna configured for selective MIMO transmission, the first RTS comprises an Rx antenna configured for selective MIMO reception, the PTS is configured to perform selective MIMO encoding of the backhaul service data onto a MIMO transmission block of the first Tx signal, and the first RTS is configured to identify the MIMO transmission block of the first Tx signal and to perform MIMO decoding of the backhaul service data therefrom.

16. The MCS of claim 1 wherein the PTS is configured to transmit at least a portion of the IBBH signals in a third LDM layer of the first Tx signal.

17. The MCS of claim 1 wherein the first RTS is configured to include the backhaul service data, or at least a portion thereof, into the second Tx signal as re-transmitted backhaul data, the MCS further comprising a second RTS configured to receive the second Tx signal, to extracted therefrom the re-transmitted backhaul data, and to transmit a third transmission (Tx3) signal comprising service data contained in the re-transmitted backhaul data.

18. The MCS of claim 1 wherein the PTS and the first RTS are configured to transmit at different carrier frequencies.

19. A relay transmitter station (RTS) for a wireless multicast communication system comprising a plurality of transmitter stations configured to transmit service data to users over a same carrier frequency, the RTS comprising:

a receive (Rx) antenna configured to receive a relay signal comprising a first transmission (Tx) signal, the first Tx signal comprising a first (L1) signal layer and a second (L2) signal layer, wherein the L2 signal layer is superimposed over the L1 signal layer using layered division multiplexing (LDM), wherein the L1 signal layer comprises L1 service signals carrying first service data, wherein the first Tx signal further includes in-band backhaul (IBBH) signals comprising backhaul service data;

a relay signal processor configured to extract the backhaul service data from the received relay signal; and a Tx antenna configured to transmit a second Tx signal comprising the backhaul service data.

20. A method for operating a wireless multicast communication system (MCS) comprising a plurality of transmitter stations (TSs) configured to transmit services to end-users, the method comprising:

at a first TS from the plurality of TSs, generating a first transmission (Tx) signal carrying service signals to end users using layered division multiplexing (LDM), the first Tx signal including in-band backhaul (IBBH) signals carrying backhaul service data, and wirelessly transmitting the first Tx signal;

at a second TS from the plurality of TSs, wirelessly receiving a relay signal comprising the first Tx signal;

performing channel estimation to detect the IBBH signals in the first Tx signal;

retrieving the backhaul service data contained in the IBBH signals; and, wirelessly transmitting a second Tx signal comprising the backhaul service data.

* * * * *